US007972498B2

(12) United States Patent
Buchanan et al.

(10) Patent No.: US 7,972,498 B2
(45) Date of Patent: Jul. 5, 2011

(54) RESID PROCESSING FOR STEAM CRACKER FEED AND CATALYTIC CRACKING

(75) Inventors: John S. Buchanan, Lambertville, NJ (US); Paul F Keusenkothen, Houston, TX (US); Stephen H. Brown, Bernardsville, NJ (US); Julian A. Wolfenbarger, Houston, TX (US); James E. Graham, Baytown, TX (US); James N. McCoy, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 499 days.

(21) Appl. No.: 11/583,567

(22) Filed: Oct. 19, 2006

(65) Prior Publication Data
US 2007/0090020 A1    Apr. 26, 2007

Related U.S. Application Data

(60) Provisional application No. 60/728,640, filed on Oct. 20, 2005, provisional application No. 60/813,555, filed on Jun. 14, 2006.

(51) Int. Cl.
*C10G 69/04* (2006.01)
*C10G 69/06* (2006.01)
*C07C 4/04* (2006.01)
(52) U.S. Cl. ............. 208/61; 208/58; 585/648; 585/652
(58) Field of Classification Search .................. 585/752, 585/648–650, 652; 208/106, 58, 61
See application file for complete search history.

(56) References Cited

U.S. PATENT DOCUMENTS

| 3,262,992 A | 7/1966 | Holzer et al. |
| 3,378,606 A | 4/1968 | Kontos |
| 3,558,474 A | 1/1971 | Gleim et al. |
| 3,586,619 A | 6/1971 | Stine |
| 3,617,493 A | 11/1971 | Wirth et al. |
| 3,720,729 A | 3/1973 | Sze et al. |
| 3,842,138 A | 10/1974 | Chahvekilian et al. |
| 3,853,969 A | 12/1974 | Kontos |
| 3,855,113 A | 12/1974 | Gould |
| 3,882,197 A | 5/1975 | Fritz et al. |
| 3,888,949 A | 6/1975 | Shih |
| 3,898,299 A | 8/1975 | Jones |
| 3,944,481 A | 3/1976 | Wing et al. |
| 4,005,006 A | 1/1977 | Montagna |
| 4,057,490 A | 11/1977 | Wynne, Jr. |
| 4,065,379 A | 12/1977 | Soonawala et al. |

(Continued)

FOREIGN PATENT DOCUMENTS
EP          0110433        8/1987
(Continued)

OTHER PUBLICATIONS

Perry's Chemical Engineers' Handbook, Seventh Edition (1997), p. 13-25.*
Collette, John W. et al.; "*Elastomeric Polypropylenes from Alumina-Supported Tetraalkyl Group IVB Catalysts, 1. Synthesis and Properties of High Molecular Weight Stereoblock Homopolymers,*" Journal of Macromolecules, vol. 22, pp. 3851-3858 (1989).

(Continued)

*Primary Examiner* — Walter D Griffin
*Assistant Examiner* — Renee Robinson

(57) ABSTRACT

The invention concerns integration of hydroprocessing and steam cracking. A feed comprising crude or resid-containing fraction thereof is treated by hydroprocessing and visbreaking and then passed to a steam cracker to obtain a product comprising olefins.

34 Claims, 6 Drawing Sheets

U.S. PATENT DOCUMENTS

| | | | |
|---|---|---|---|
| 4,179,355 | A | 12/1979 | Frayer et al. |
| 4,180,453 | A | 12/1979 | Franck et al. |
| 4,210,520 | A | 7/1980 | Wernicke et al. |
| 4,257,871 | A | 3/1981 | Wernicke et al. |
| 4,297,204 | A | 10/1981 | Schliebener et al. |
| 4,298,458 | A | 11/1981 | Banta et al. |
| 4,461,872 | A | 7/1984 | Su |
| 4,665,130 | A | 5/1987 | Hwo |
| 4,713,221 | A | 12/1987 | Montgomery et al. |
| 4,921,749 | A | 5/1990 | Bossaert et al. |
| 5,069,775 | A | 12/1991 | Grosboll |
| 5,079,273 | A | 1/1992 | Kuroda et al. |
| 5,171,628 | A | 12/1992 | Arvedson et al. |
| 5,213,744 | A | 5/1993 | Bossaert |
| 5,290,635 | A | 3/1994 | Matsumura et al. |
| 5,298,561 | A | 3/1994 | Cecchin et al. |
| 5,331,047 | A | 7/1994 | Giacobbe |
| 5,453,318 | A | 9/1995 | Giacobbe |
| 5,504,172 | A | 4/1996 | Imuta et al. |
| 5,652,308 | A | 7/1997 | Merrill et al. |
| 5,723,217 | A | 3/1998 | Stahl et al. |
| 5,726,103 | A | 3/1998 | Stahl et al. |
| 5,736,465 | A | 4/1998 | Stahl et al. |
| 5,763,080 | A | 6/1998 | Stahl et al. |
| 5,891,814 | A | 4/1999 | Richeson et al. |
| 5,902,554 | A | 5/1999 | Kirkbride |
| 5,910,362 | A | 6/1999 | Aratake et al. |
| 5,959,006 | A | 9/1999 | Pungtrakul |
| 5,994,482 | A | 11/1999 | Georgellis et al. |
| 6,010,588 | A | 1/2000 | Stahl et al. |
| 6,017,615 | A | 1/2000 | Thakker et al. |
| 6,054,496 | A | 4/2000 | Crane et al. |
| 6,080,818 | A | 6/2000 | Thakker et al. |
| 6,096,420 | A | 8/2000 | Wilhoit et al. |
| 6,143,818 | A | 11/2000 | Wang et al. |
| 6,149,800 | A | 11/2000 | Iaccino et al. |
| 6,153,703 | A | 11/2000 | Lustiger et al. |
| 6,165,599 | A | 12/2000 | Demeuse |
| 6,187,449 | B1 | 2/2001 | Sasaki et al. |
| 6,190,533 | B1 | 2/2001 | Bradow et al. |
| 6,303,842 | B1 | 10/2001 | Bridges et al. |
| 6,342,565 | B1 | 1/2002 | Cheng et al. |
| 6,388,013 | B1 | 5/2002 | Saraf et al. |
| 6,476,135 | B1 | 11/2002 | Bugada et al. |
| 6,500,563 | B1 | 12/2002 | Datta et al. |
| 6,503,588 | B1 | 1/2003 | Hayashi et al. |
| 6,525,157 | B2 | 2/2003 | Cozewith et al. |
| 6,531,214 | B2 | 3/2003 | Carter et al. |
| 6,583,076 | B1 | 6/2003 | Pekrul et al. |
| 6,620,311 | B2 | 9/2003 | Morel et al. |
| 6,632,351 | B1 | 10/2003 | Ngan et al. |
| 6,635,715 | B1 | 10/2003 | Datta et al. |
| 6,642,316 | B1 | 11/2003 | Datta et al. |
| 6,730,754 | B2 | 5/2004 | Resconi et al. |
| 6,743,961 | B2 | 6/2004 | Powers |
| 6,747,114 | B2 | 6/2004 | Karandinos et al. |
| 6,750,284 | B1 | 6/2004 | Dharmarajan et al. |
| 6,800,692 | B2 | 10/2004 | Farley et al. |
| 6,875,485 | B2 | 4/2005 | Kanai et al. |
| 6,887,941 | B2 | 5/2005 | Zhou |
| 6,900,147 | B2 | 5/2005 | Morman et al. |
| 6,906,160 | B2 | 6/2005 | Stevens et al. |
| 6,921,794 | B2 | 7/2005 | Cozewith et al. |
| 6,932,592 | B2 | 8/2005 | Farley et al. |
| 6,984,696 | B2 | 1/2006 | Curry et al. |
| 6,989,091 | B2 | 1/2006 | Jorgensen |
| 7,476,710 | B2 | 1/2009 | Mehta et al. |
| 2002/0195373 | A1 | 12/2002 | Ino et al. |
| 2003/0070808 | A1 | 4/2003 | Allison |
| 2004/0004022 | A1 | 1/2004 | Stell et al. |
| 2004/0004027 | A1 | 1/2004 | Spicer et al. |
| 2004/0004028 | A1 | 1/2004 | Stell et al. |
| 2004/0035864 | A1 | 2/2004 | Mino |
| 2004/0039240 | A1 | 2/2004 | Powers |
| 2004/0065589 | A1 | 4/2004 | Jorgensen |
| 2005/0133405 | A1 | 6/2005 | Wellington |
| 2005/0133406 | A1 | 6/2005 | Wellington |
| 2005/0133414 | A1 | 6/2005 | Bhan et al. |
| 2005/0133415 | A1 | 6/2005 | Bhan et al. |
| 2005/0133416 | A1 | 6/2005 | Bhan et al. |
| 2005/0133417 | A1 | 6/2005 | Bhan et al. |
| 2005/0133418 | A1 | 6/2005 | Bhan et al. |
| 2005/0135997 | A1 | 6/2005 | Wellington et al. |
| 2005/0139512 | A1 | 6/2005 | Wellington et al. |
| 2005/0139518 | A1 | 6/2005 | Bhan et al. |
| 2005/0139519 | A1 | 6/2005 | Bhan et al. |
| 2005/0139520 | A1 | 6/2005 | Bhan et al. |
| 2005/0139521 | A1 | 6/2005 | Bhan et al. |
| 2005/0139522 | A1 | 6/2005 | Bhan et al. |
| 2005/0145536 | A1 | 7/2005 | Wellington et al. |
| 2005/0145537 | A1 | 7/2005 | Wellington et al. |
| 2005/0145538 | A1 | 7/2005 | Wellington et al. |
| 2005/0145543 | A1 | 7/2005 | Bhan et al. |
| 2005/0150818 | A1 | 7/2005 | Bhan et al. |
| 2005/0155906 | A1 | 7/2005 | Wellington et al. |
| 2005/0155908 | A1 | 7/2005 | Bhan et al. |
| 2005/0167320 | A1 | 8/2005 | Bhan et al. |
| 2005/0167321 | A1 | 8/2005 | Wellington et al. |
| 2005/0167322 | A1 | 8/2005 | Wellington et al. |
| 2005/0167323 | A1 | 8/2005 | Wellington et al. |
| 2005/0167324 | A1 | 8/2005 | Bhan et al. |
| 2005/0167325 | A1 | 8/2005 | Bhan et al. |
| 2005/0167326 | A1 | 8/2005 | Bhan et al. |
| 2005/0167327 | A1 | 8/2005 | Bhan et al. |
| 2005/0167328 | A1 | 8/2005 | Bhan et al. |
| 2005/0167329 | A1 | 8/2005 | Bhan et al. |
| 2005/0167330 | A1 | 8/2005 | Bhan et al. |
| 2005/0167331 | A1 | 8/2005 | Bhan et al. |
| 2005/0167332 | A1 | 8/2005 | Bhan et al. |
| 2005/0170952 | A1 | 8/2005 | Wellington et al. |
| 2005/0173298 | A1 | 8/2005 | Wellington et al. |
| 2005/0173303 | A1 | 8/2005 | Bhan et al. |
| 2005/0209495 | A1 | 9/2005 | McCoy et al. |
| 2005/0261530 | A1 | 11/2005 | Stell et al. |
| 2005/0261531 | A1 | 11/2005 | Stell et al. |
| 2005/0261532 | A1 | 11/2005 | Stell et al. |
| 2005/0261533 | A1 | 11/2005 | Stell et al. |
| 2005/0261534 | A1 | 11/2005 | Stell et al. |
| 2005/0261535 | A1 | 11/2005 | Beattie et al. |
| 2005/0261536 | A1 | 11/2005 | Stell et al. |
| 2005/0261538 | A1 | 11/2005 | Stell |
| 2006/0014992 | A1 | 1/2006 | Stell et al. |
| 2006/0014993 | A1 | 1/2006 | Stell et al. |
| 2006/0014994 | A1 | 1/2006 | Keusenkothen |
| 2006/0089519 | A1 | 4/2006 | Stell et al. |
| 2006/0094918 | A1 | 5/2006 | McCoy et al. |
| 2006/0129012 | A1 | 6/2006 | Frye et al. |

FOREIGN PATENT DOCUMENTS

| | | |
|---|---|---|
| GB | 2071133 | 9/1981 |
| JP | 57212294 | 6/1981 |
| JP | 58005393 | 7/1981 |
| JP | 58908387 | 12/1981 |
| WO | 00/40677 | 7/2000 |
| WO | WO 03/021569 | 3/2003 |
| WO | WO 03/040233 | 5/2003 |
| WO | WO 03/040442 | 5/2003 |
| WO | 2004/005431 | 1/2004 |
| WO | WO 2004/035681 | 4/2004 |
| WO | WO 2004/060994 | 7/2004 |
| WO | WO 2004/087806 | 10/2004 |
| WO | WO 2005/052052 | 6/2005 |
| WO | 2007/005473 | 1/2007 |
| WO | 2007/047657 | 1/2007 |
| WO | 2007/047941 | 4/2007 |

OTHER PUBLICATIONS

Collette, John W. et al.; "Elastomeric Polypropylenes from Alumina-Supported Tetraalkyl Group IVB Catalysts, 2. Chain Microstructure, Crystallinity, and Morphology," Journal of Macromolecules, vol. 22, pp. 3858-3866 (1989).

* cited by examiner

RESID PROCESSING FOR STEAM CRACKER FEED AND CATALYTIC CRACKING

RELATED APPLICATIONS

This application claims benefit of and priority to U.S. Provisional patent application Ser. No. 60/728,640 (2005B125), filed Oct. 20, 2005, and also claims benefit of U.S. Provisional patent application No. 60/813,555 (2006B101), filed Jun. 14, 2006.

FIELD OF THE INVENTION

The invention relates to a method of making olefins from a crude or resid-containing fraction thereof.

BACKGROUND OF THE INVENTION

Thermal cracking of hydrocarbons is a petrochemical process that is widely used to produce olefins such as ethylene, propylene, butylenes, butadiene, and aromatics such as benzene, toluene, and xylenes. Each of these is a valuable commercial product. For instance, the light olefins can be oligomerized (e.g., to form lubricant basestocks), polymerized (e.g., to form polyethylene, polypropylene, and other plastics), and/or functionalized (e.g., to form acids, alcohols, aldehydes, and the like), all of which have well-known intermediate and/or end uses. One thermal cracking process is steam cracking, which involves cracking hydrocarbons in the presence of hydrogen and/or hydrogen-containing components, such as steam.

The starting feedstock for a conventional olefin production plant, as described above, has been subjected to substantial (and expensive) processing before it reaches the olefin plant. Normally, whole crude is first subjected to desalting prior to being distilled or otherwise fractionated or cracked into a plurality of parts (fractions) such as gasoline, kerosene, naphtha, gas oil (vacuum or atmospheric) and the like, including a high boiling residuum ("resid"). The resid cut typically has a boiling point of greater than about 650° F. (343° C.), at about atmospheric pressure. After desalting and removal of the resid fractions, conventionally, any of these fractions other than the 650° F.+ (343° C.+) resid, may be passed to a steam cracker or olefin production plant as the feedstock for that plant.

Typically in steam cracking, a hydrocarbon feedstock for steam cracking, such as naphtha, gas oil, or other non-resid containing fractions of whole crude oil, which may be obtained, for instance, by distilling or otherwise fractionating whole crude oil, is introduced to a steam cracker, usually mixed with steam. Conventional steam cracking utilizes a pyrolysis furnace that generally has two main sections: a convection section and a radiant section. In the conventional pyrolysis furnace, the hydrocarbon feedstock enters the less severe convection section of the furnace as a liquid (except for light feedstocks which enter as a vapor) wherein it is heated and vaporized by indirect contact with hot flue gas from the radiant section and optionally by direct contact with steam. The vaporized feedstock and steam mixture (if present) is then introduced through crossover piping into the radiant section where it is quickly heated, at pressures typically ranging from about 10 to about 30 psig, to a severe hydrocarbon cracking temperature, such as in the range of from about 1450° F. (788° C.) to about 1550° F. (843° C.), to provide thorough thermal cracking of the feedstream. The resulting products, comprising olefins, leave the pyrolysis furnace for further downstream separation and processing.

After cracking, the effluent from the pyrolysis furnace contains gaseous hydrocarbons of great variety, e.g., saturated, monounsaturated, and polyunsaturated, and can be aliphatic and/or aromatic, as well as significant amounts of molecular hydrogen. The cracked product is then further processed such as in the olefin production plant to produce, as products of the plant, the various separate streams of high purity products mentioned above, i.e., hydrogen, the light olefins ethylene, propylene, and butenes, and aromatic compounds, as well as other products such as pyrolysis gasoline.

As worldwide demand for light olefins increases and the availability of favorable crude sources is depleted, it becomes necessary to utilize heavier crudes (i.e., those having higher proportions of resid), which requires increased capital investments to process and handle the refining byproducts and purchase the higher grade feedstocks. It is highly desirable to have processes that can take lower cost, heavier crudes, and produce a more favorable product mix of light olefins, more efficiently.

It has previously been proposed to upgrade certain crude fractions, prior to steam cracking, by first hydroprocessing the feed. For instance, U.S. Pat. Nos. 3,855,113 and 6,190,533 are directed to a process comprising passing the feed to a hydroprocessing zone followed by a steam cracking zone. In neither case, however, is whole crude or a fraction comprising resid passed directly to the hydroprocessing zone. See also GB 2071133 and Erdoel & Kohle, Erdgas, Petrochemie (1981), 34(1), 443-6.

Conventional resid hydroprocessing or "residfining" is a known process for upgrading a portion of the resid containing crude fraction. The hydrogenated liquid and vapor products (but not the resid products) from residfining are typically fractionated into more valuable streams, e.g., fuel oil, diesel, heating oil, jet, kerosene, gasoline, LPG, and fuel gas. Each of these is useful per se as fuels and/or as intermediates for the production of, for instance, petrochemicals. By way of example, fuel oil may also be cracked to produce the lighter boiling fuels, such as gasoline, LPG, and fuel gas and/or the petrochemicals ethylene, propylene, and butanes. The resid fraction is typically a low-value product. However, subsequent to hydroprocessing and before or during the further distillation of the resid stream, conversion, deasphalting, or other processing may be performed on the resid containing crude fraction.

U.S. Pat. No. 3,898,299 discloses a process for removing the resid fractions and producing olefins from the non-resid, lower boiling point hydrocarbons. Atmospheric resid from distillation is hydroprocessed and the liquid hydroprocessor effluent is "fed in the presence of steam directly to the pyrolysis zone wherein unvapourized feedstock is removed as a residue fraction in a separation zone prior to entry of the vapourised distillate fraction into that region of the pyrolysis zone maintained under conditions which effect thermal cracking." However, the '299 reference only teaches conventional hydroprocessing and thermal steam cracking of the non-resid-containing overhead stream and does not properly suggested or teach how to use the resid containing effluent from a resid hydroprocessing unit as a feed for a steam cracker. The '299 patent requires the typical separation and removal of the 650° F.+ (343° C.) boiling point fractions from the treated hydroprocessor effluent, prior to steam cracking. Only the distillate fractions are processed to olefins. Those skilled in the art are well aware of the practical difficulties involving equipment fouling of conventional equipment of the '299 patent, for steam cracking resid-containing feeds. Resid hydroprocessing is a known process for upgrading resid to fuels such as fuel oil, diesel, heating oil, jet, kerosene, gasoline, LPG, and fuel gas. Each of these are useful as fuels and/or as intermediates for the production of, for instance, petrochemicals.

Other patents of interest related to cracking heavy feeds include U.S. Pat. No. 4,257,871, to Wernicke; U.S. Pat. No. 4,065,379, to Soonawala; U.S. Pat. No. 4,180,453, to Franck; and U.S. Pat. No. 4,210,520, to Wernicke. However, each of the aforementioned patents do not adequately teach how to steam crack a resid-containing hydrocarbon stream for the production of olefins.

In U.S. Pat. No. 4,257,871, vacuum resid is used for the production of olefins by first separating the asphalt therein, blending resultant asphalt-depleted fraction with a lighter fraction, and then subjecting the blend to a conventional catalytic hydrogenation step prior to thermal cracking. See also U.S. Pat. No. 4,297,204.

Japanese Kokai Patent Application Sho 58[1983]-98387 relates to a method of manufacture of gaseous olefin and mononuclear aromatic hydrocarbon, characterized by hydrogenating crude with hydrogen and a hydrogenation catalyst, followed by thermal cracking. In an embodiment hydrogenated crude oil may be distilled or flashed to separate components with the overhead stream fed to the thermal cracking process. See also Japanese Kokai Patent Application Sho 58[1983]-005393 and Japanese Kokai Patent Application Sho 57[1982]-212294.

U.S. Pat. No. 6,303,842 teaches producing olefins by thermally steam cracking residuum containing a short residuum having a boiling point range greater than 565° C., wherein at least 3 weight percent of the short residuum has a boiling point greater than or equal to 650° C. The feedstock is produced by conventional hydroprocessing. Other references of interest include U.S. Pat. Nos. 3,855,113; 4,057,490; 4,179,355; and 6,743,961. Still other patents of interest related to cracking heavy feeds include U.S. Pat. No. 4,257,871, to Wernicke; U.S. Patent No. 4,065,379, to Soonawala; U.S. Pat. No. 4,180,453, to Franck; and U.S. Pat. No. 4,210,520, to Wernicke.

WO 2004/005431 discloses a process for steam cracking certain feedstocks comprising resid, whereby a substantial unconverted liquid resid fraction is removed prior to steam cracking. The '5431 invention does not disclose or teach hydrogenation as a process useful for upgrading heavy, sour, crude oil and resid feedstocks, including the resid fractions, such that the whole crude, including resid fractions, may be steam cracked and converted to petrochemicals. Heavy, sour feedstocks do not contain high concentrations of the linear paraffins, which are known to make the highest quality steam cracker feedstocks. The atmospheric and vacuum resid fractions of crude oils containing >2.0 wt % sulfur almost always have a hydrogen content <12.5 wt % and typically they have a hydrogen content of <11.0 wt %. It is well known that conventional resid hydroprocessing produces product highly prone to fouling.

There remains in the art, means and processes for economical processing of heavy, resid containing whole crudes, and resid containing hydrocarbon fractions thereof, for the production of olefins, aromatics, and other valuable petrochemical products. All known art previous to this invention, has deficiencies, shortcomings, or undesirable aspects.

SUMMARY OF THE INVENTION

The present inventors have surprisingly discovered that resid hydroprocessing that is increased in severity and heat integrated with a steam cracker, may be used to produce useful products such as olefins and/or aromatic compounds by integration of at least one hydroprocessing step, at least one step of visbreaking, and at least one thermal cracking step.

This invention provides a process by which a hydroprocessing effluent containing a resid fraction therein may be used as steam cracker feed. The inventors have also discovered that crude or a resid-containing fraction thereof may be hydroprocessed for use as steam cracker feed stock. The hydroprocessed, resid-containing feedstock may be steam cracked to produce useful products such as olefins and/or aromatic compounds. The invention is directed to a process integrating hydrogenation of a resid-containing material with steam cracking to obtain an olefins product.

In an embodiment, there is a process of producing olefins from a feedstream comprising crude or crude fractions containing resid, the process including a step of hydroprocessing, a step of visbreaking, and a step of thermal cracking. The process and apparatus are capable of rejecting only the heaviest, most undesirable resid components of the feedstream and passing substantially only vaporized components, including vaporized components derived from resid, into the radiant section of the steam cracker.

In preferred embodiments of any of the aforementioned, there is a step of visbreaking prior to steam cracking and/or there is a vapor liquid separation device, e.g., a visbreaker, integrated with the thermal pyrolysis furnace. Visbreaking can occur in the integrated vapor liquid separation device eliminating the need for a separate conventional visbreaker process or equipment.

In another preferred embodiment, there is a process comprising cracking a portion of the resid components in a hydroprocessing step, obtaining an effluent from a resid hydroprocessing unit, visbreaking the effluent, and passing the overhead from the visbreaking step to the radiant section of a steam cracker. Here again the visbreaking may occur in an integrated vapor liquid separation device or a visbreaker separate from the steam cracker.

In one preferred embodiment, the process further comprises an integrated fractionation step, such as by use of a flash drum to remove asphaltenes and/or remaining fractions boiling above about 1050° F. (about 566° C.) and preferably only those remaining fractions boiling above about 1100° F. (about 593° C.) from the feed prior to passing the feed to the radiant section of the steam cracker unit. Surprisingly, this can be accomplished with fouling rates that are equal to or better than the fouling rates of VGO steam cracker feedstocks. Preferably at least one flash drum or other flash device, such as an in-line choke, or orifice plate is provided to reduce the pressure in the hydroprocessor effluent and cause the conversion of some of the liquids to vapors, is provided. Preferably the flashing device is integrated with the feed to the steam cracker thermal pyrolysis unit. Integrated means heat integrated, such that heat may be obtained for the conversion, cracking, flashing, and separation process from one or more of the steps in the process, such as during hydroprocessing, preheating in a convection section, and/or from the steam cracker. In preferred embodiments, the pressure of the effluent form the hydroprocessor is flashed or depressurized, at least one of prior to separation or during separation. Flashing also includes the possibility of introducing the effluent to a vacuum.

In another preferred embodiment, the invention comprises a process for preparing a resid-containing hydrocarbon feedstock for steam cracking the same. The inventive process comprises in one aspect hydroprocessing the feed to hydrogenate the feedstock to improve the hydrogen saturation of the cracked effluent. The inventive process further comprises improving the hydrogenated resid-containing hydroprocessor effluent by further processing the same in a visbreaker to thermally crack the undesirable effluent and recover an improved resid containing vapor effluent from the visbreaking process in a vapor liquid separator, such as may be used in a visbreaking separation process. The invention comprises still further improving the quality of the feed by visbreaking and/or separating the visbreak-processed material in a visbreaker and/or vapor-liquid separator that is integrated with the steam cracker, more preferably with the convection section of the steam cracker.

In an embodiment of the various embodiments of the invention wherein the effluent is obtained from a resid hydroprocessing unit, the feedstream to the resid hydroprocessing unit comprises crude that has not been fractionated or a crude fraction containing resid. In another embodiment, hydroprocessing is carried out using at least one fixed bed hydrogenation reactor, ebullating reactor, or fluidized hydrogenation reactors, prior to being fed to a thermal pyrolysis unit.

In yet other embodiments, feeds to be hydroprocessed comprise one or more of recycled steam cracker tar, heavy crudes, or topped crude, and feeds to be steam cracked comprise hydroprocessed recycled steam cracker tar, heavy crudes, or topped crudes. In another preferred embodiment, the source of hydrogen for the hydroprocessing is from remote methane.

Some preferred embodiments also include combinations of two or more of the above embodiments, including preferred embodiments. In yet still another preferred embodiment, feeds such as whole crude, with or without desalting, or the product of a refinery pipestill or a chemical intermediate stream containing asphaltene or resid, such as atmospheric resid or vacuum resid, or steam cracked tar are hydroprocessed using fixed bed hydrogenation reactors or ebullating or fluidized hydrogenation reactors prior to being fed to a thermal pyrolysis unit having a vapor liquid separation device integrated therewith.

The invention is also directed to a system comprising a hydroprocessing apparatus, a thermal pyrolysis unit, and at least one vapor liquid separation device for visbreaking, wherein the vapor liquid separation device is advantageously integrated with the thermal pyrolysis unit, and also to a process comprising feeding a resid-containing feed through the system to obtain a product comprising light olefins (one or more of C2-C6 olefins). In a preferred embodiment, the system further comprises a steam reformer for converting methane to hydrogen to provide hydrogen to the hydroprocessing apparatus. It is an object of the invention to provide resid as a preferred feed to the olefins producer, and thus enable use of lower quality crude feedstocks. It is another object of the invention to increase the hydrogen content of steam cracker feed while minimizing the increase in hydrogen content of the resid content of the feed.

These and other objects, features, and advantages will become apparent as reference is made to the following detailed description, preferred embodiments, examples, and appended claims.

BRIEF DESCRIPTION OF THE DRAWINGS

In the accompanying drawings, reference numerals, labels, or other indicia identifying parts or process components, are used to denote like parts or components, throughout the several views.

DETAILED DESCRIPTION

Figure 1:
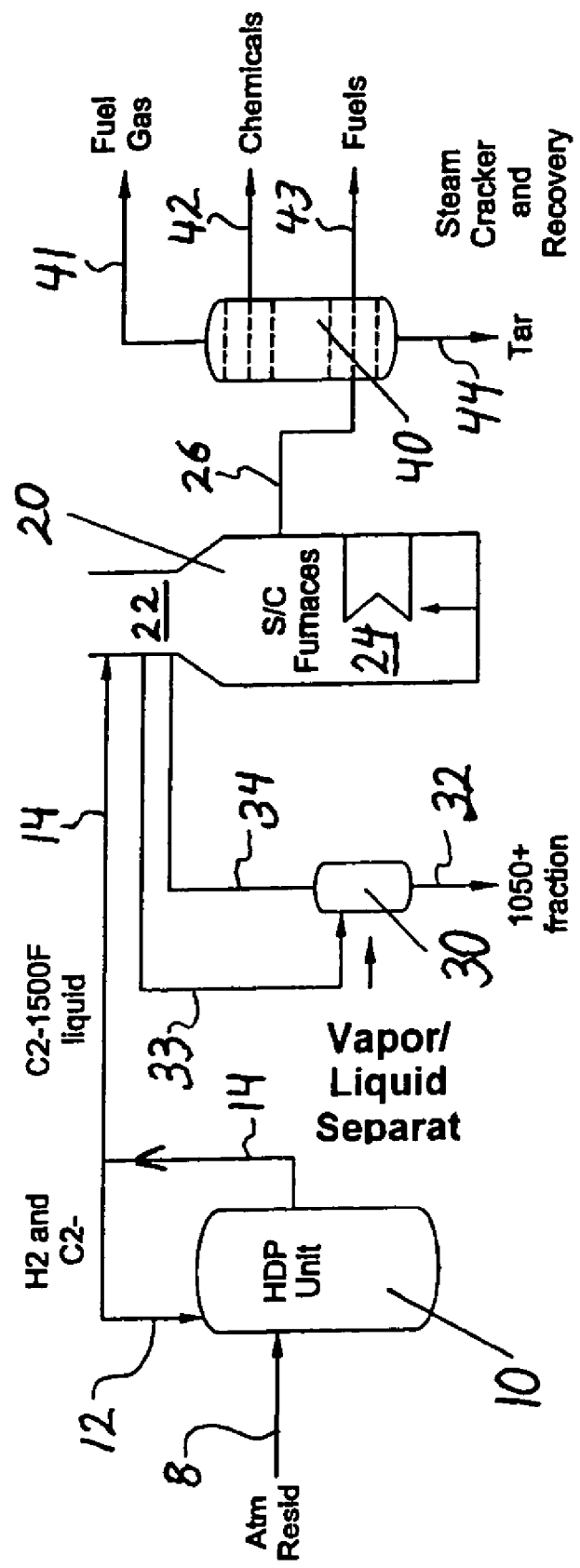
FIGS. 1-6 are process flow diagrams illustrating some exemplary embodiments of the invention.

In one embodiment, the resid-containing, incipient thermally cracked effluent from a hydroprocessor, preferably a resid hydroprocessor, including those resid fractions having a boiling point of less than about 1050° F. (about 566° C.) and preferably those resid fractions having a boiling point of less than about 1100° F. (about 593° C.), are further cracked substantially, such as in a visbreaker/separator, and used as feed for a steam cracker or other thermal pyrolysis unit. In the pyrolysis unit, the vaporized fractions are converted to desired products including olefins. The terms thermal pyrolysis unit, pyrolysis unit, steam cracker, and steamcracker are used synonymously herein; all refer to what is conventionally known as a steam cracker, even though steam is optional.

According to the invention a crude or fraction thereof containing resid is hydroprocessed. Typically, resid hydroprocessing according to the present invention may be carried out at a temperature of at least about 600° F. (315° C.), preferably at least about 650° F. (343° C.), more preferably at least about 750° F. (399° C.). Preferably the pressure is at least 1800 psig. The intention is to initiate thermal cracking of at least a portion of the 650° F.+ (343° C.+) resid, e.g., incipient thermal cracking, during the hydroprocessing step. Such processing of heavy crudes or heavy resid fractions may typically require a temperature of at least 750° F. (399° C.+) to initiate thermal cracking of the lighter resid fractions. Thus, in some embodiments of the inventive processes, the incipient thermal cracking temperature for the hydroprocessor unit will be at least about 750° F. (399° C.), or at least about 780° F. (451° C.), and in still other embodiments, the temperature will have to be at least about 800° F. (427° C.). A preferred processing temperature range may be from about 650° F. (343° C.) to about 900° F. (482° C.). According to still other alternative embodiments of the processes of the present invention, hydroprocessing may be performed at a temperature of from about 500° F. (260° C.) to about 900° F. (482° C.), preferably from about 650° F. (343° C.) to 900° F. (482° C.), more preferably from about 700° F. (371° C.) to 900° F. (482° C.), more preferably from about 750° F. (399° C.) to about 900° F. (482° C.), and still more preferably from about 750° F. (399° C.) to about 800° F. (427° C.). In some embodiments, the preferred pressure is from about 500 to 10,000 psig, preferably 1000 to 4000 psig may be used, and more preferably from about 1500 to 3000 psig. The selected temperature may vary according to the composition and conditions of the hydrocarbon feed. Preferred liquid hourly space velocity may be from about 0.1 to 5, preferably 0.25 to 1. The hydrogen supply rate (makeup and recycle hydrogen) to the hydroconversion zone may be in the range of from about 500 to about 20,000 standard cubic feet per barrel of hydrocarbon feed, preferably about 2,000 to 5,000 standard cubic feet per barrel. The hydroprocessing may be carried out utilizing a single zone or a plurality of hydroprocessing zones, e.g., two or more hydroprocessing zones in parallel or in series. For example, in one embodiment a first zone may comprise a first catalyst that may be designed to accumulate most of the metals removed from the feedstock, and in series a second zone may comprise a second catalyst that can be designed for maximum heteroatom removal and aromatics hydrogenation. In another embodiment, a first catalyst can be designed to accumulate most of the metals removed from the feedstock, and a second zone with a second catalyst can be designed for maximum heteroatom removal and a third zone with a third catalyst can be designed to increase aromatics hydrogenation. The first and second catalysts may be piped in series reactors or loaded in series in the same zone. Design specifics as it relates to the resid hydroprocessor(s) alone do not form a critical part of this invention.

The catalyst employed in the typical commercial hydroconversion zone(s) is comprised of material having hydrogenation-dehydrogenation activity together with an amorphous carrier. Exemplary amorphous carriers include alumina, silica-alumina, silica, zirconia, or titania. Hydrogenation-dehydrogenation components of the catalyst preferably comprise at least one hydrogenation component selected from Group VI metals and compounds of Group VI metals and at least one hydrogenation component selected from Group VIII metals and compounds of Group VIII metals. Preferred combinations of hydrogenation components include nickel sulfide with molybdenum sulfide, cobalt sulfide with molybdenum sulfide, cobalt with molybdenum, and nickel with tungsten. The catalyst employed in the invention may also be comprised of a material having hydrogenation-dehydrogenation activity formulated without an amorphous carrier. Exemplary catalysts include Nebula.

According to the present invention, resid hydroprocessing may preferably be carried out at a temperature and pressure that is more severe than conventional hydroprocessing processes are carried out. In one embodiment, the hydroprocessing preferably may be carried out at above 650° F. (343° C.) and up to a temperature that produces substantial hydrocarbon cracking during the hydrogenation process, such as about 750° F. (399° C.) to about 800° F. (427° C.). This not only generates a hydrogenated resid component but also cracks or breaks down a substantial portion of the resid component into light fractions. The light fractions, along with injected steam, help with conversion, cracking and further vaporization and thermal processing of the stream within the steam cracker, such as within the cracker piping.

Resid hydroprocessing includes substantially any process resulting in the hydrogenation of resid and/or resid-containing fractions, and encompasses (but is not limited to) commercially available resid hydroprocessing technologies. Examples of these commercially available processes are the H-Oil process, the Chevron RDS, VRDS, OCR, and LC-Fining processes, the HYVAHL process, and the ENI-Snamprogetti EST process. Suitable hydroprocessing processes may include, for example, fixed bed catalyst systems, ebullating bed systems, fluidized bed systems, and/or combinations thereof. Hydroprocessing as used herein also includes some mild cracking of the 650° F.+ (343° C.+) resid component of the hydrocarbon feed, and preferably even some cracking of the boiling fractions from 650° F.+ (343° C.+) up to the about 1050° F.+ (565° C.+) boiling point fractions, and more preferably up to the about 1100° F.+ (593° C.+) fractions.

The hydrogenated feed from the hydroprocessor may then be further fractionated or vaporized and fed whole to a steam cracker. Complete vaporization may take place in the steam cracker system. A combination of separators, flash separators, and/or separation pots may be provided as desired between hydrogenation and cracking. In preferred embodiments, separator processes may be integrated with the heating and cracking process, such as with the steam cracker. e.g., A vapor-liquid separator or separation process may be provided within the convection section of the steam cracker or between the convection section and radiant section of the cracker.

Resid hydroprocessing preferably comprises increasing the hydrogen content of the whole crude or crude fraction containing resid, by at least about 1 wt %, preferably by 1.5 wt %, and most preferably to a nearly saturated or fully saturated feed stream effluent from the hydroprocessor. It may be preferred in some embodiments that the effluent from the hydroprocessor has a hydrogen content in excess of 12.5 wt % and more preferably in excess of 13 wt %. Increasing the hydrogen content of the whole crudes, crude fractions, or other feed stocks may serve to render the hydrogenated product thereof suitable for feeding to a pyrolysis unit for cracking, thereby generating more valuable end products, such as olefins. Thereby, lower cost steam cracker feeds may be used for the production of olefins. Suitable lower value feeds may typically include heavier crudes, those hydrocarbon feedstocks that have high concentrations of resid, high sulfur, high TAN, high aromatics, and/or low hydrogen content. Hydrogenation of the crude or crude fractions, and removal of contaminants may facilitate feeding such effluent to a steam cracker system or apparatus that is capable of rejecting the heaviest components of the feedstream, such as the asphaltenes and the 1100° F.+ (593° C.+) fractions. The remainder of the effluent, including the vaporized resid fraction, e.g., the cracked and vaporized 650° F.+ (343° C.), up to the 1050° F.+ (565° C.) fractions, even up to the 1100° F.+ (593° C.+) fractions, up to and including some of the 1400° F. (760TC) and lower boiling point fractions that is vaporized, is fed into the radiant section of the steam cracker for severe cracking and production of valuable petrochemical products, such as olefins, without undesirable fouling and without resulting in the undesirable production of tar and coke.

Surprisingly, this process may be performed without resulting in uncontrollable equipment fouling or the undesirable production of high yields of tar and resid-containing byproducts. Also surprisingly, the fully hydrogenated crude may be substantially completely vaporized in the steam cracker and result in increased petrochemical yields. Conversion and vaporization may also be supported by steam assisted flash vaporization. Further, the severe hydrogenation may also greatly reduce production of steam cracker tar.

In a preferred embodiment, the hydroprocessor effluent selected to be steam cracked comprises a substantial resid fraction boiling from about 700° F. (371° C.) to about 900° F. (482° C.). In another preferred embodiment, if the hydroprocessor effluent contains resid, it may be first treated to remove a portion of the resid, such as the asphaltenes, prior to feeding the treated and hydrogenated resid-containing material into the convection section or the radiant section of the thermal pyrolysis unit (steam cracker). Preferred methods of removing the undesirable resid portions are discussed below.

Crude, as used herein, means whole crude oil as it issues from a wellhead, production field facility, transportation facility, or other initial field processing facility, optionally including crude that has been processed by a step of desalting, treating, and/or other steps as may be necessary to render it acceptable for conventional distillation in a refinery. Crude as used herein is presumed to contain resid unless otherwise specified.

Crude fractions are typically obtained from the refinery pipestill. Although any crude fraction obtained from the refinery pipestill may be useful in the present invention, the significant advantage offered by the present invention is that crude or crude fractions still containing all or a portion of the original resid present in the whole crude obtained from the wellhead may be hydroprocessed and subsequently used as feed for a steam cracker. In one embodiment, the crude or other feedstock to the hydroprocessing unit may comprise at least about 1 wt % resid, preferably at least about 5 wt % resid, more preferably at least about 10 wt % resid, and even more preferably at least about 20 wt % resid.

Resid as used herein refers to the complex mixture of heavy petroleum compounds otherwise known in the art as residuum or residual. Atmospheric resid is the bottoms product produced in atmospheric distillation when the endpoint of the heaviest distilled product is nominally 650° F. (343° C.), and is referred to as 650° F.+ (343° C.+) resid. Vacuum resid is the bottoms product from a column under vacuum when the heaviest distilled product is nominally 1050° F. (566° C.), and is referred to as 1050° F.+ (565° C.+) resid. (The term "nominally" means here that reasonable experts may disagree on the exact cut point for these terms, but probably by no more than +/−50° F. (or at most +/−100° F.). This 1050° F.+ (565° C.) portion contains asphaltenes, which traditionally are considered to be an anathema to the steam cracker, resulting in corrosion and fouling of the apparatus. The term "resid" as used herein means the 650° F.+ (343° C.+) resid and 1050° F.+ (565° C.+) resid unless otherwise specified; note that 650° F.+ (343° C.+) resid comprises 1050° F.+ (565° C.+) resid. According to this invention, at least a portion of the 650° F.+ (343° C.) resid, up to at least the 1050° F.+ (565° C.) boiling point fraction, is vaporized, such as during (i) hydroprocessing, (ii) when combined with steam, and/or (iii) when the pressure is reduced or flashed between the hydroprocessing unit and steam cracking, e.g., during flash separation.

Resid may also typically contain a high proportion of undesirable impurities such as sulfur and nitrogen, as well as high molecular weight (C12+) naphthenic acids (measured in terms of TAN according to ASTM D-664). Yet another advantage of the present invention is that feeds high in one or more of these impurities may be readily processed. As an example of one specific species of impurities, a large amount of sulfur may be tied up in multi-ring heterocycles. By hydrotreating resid containing such species, not only is sulfur removed as $H_2S$, but the heterocyclic rings are broken up to yield a significant amount of monocyclic aromatic species, which are often valuable commodities by themselves and are also a preferred feed to steam crackers.

The term "hydroprocessing" as used herein is defined to include those processes comprising processing a hydrocarbon feed in the presence of hydrogen to hydrogenate or otherwise cause hydrogen to react with at least a portion of the feed. This includes, but is not limited to, a process comprising the step of heating a resid-containing hydrocarbon feed stream in a hydroprocessing step in the presence of hydrogen, preferably also under pressure. Hydroprocessing may also include but is not limited to the process known as, hydrofining, hydrotreating, hydrodesulfurization (HDS), hydrodenitrogenation (HDN), hydrodeoxygenation (HDO), hydrofining and hydrocracking.

The term "steam cracker" as used herein is also known more generally as thermal pyrolysis unit or furnace or just pyrolysis furnace. Steam, although optional, is typically added for one or more reasons, such as to reduce hydrocarbon partial pressure, to control residence time, and/or to minimize coke formation. In preferred embodiments the steam may be superheated, such as in the convection section of the pyrolysis unit, and/or the steam may be sour or treated process steam.

It is conventional to desalt prior to passing the feed to the pipestill. When resid from the pipestill is meant to be hydroprocessed, the crude oil feed to the refinery is often double desalted. Desalting typically removes metal salts such as NaCl. However, the desalted crude and crude fractions may still contain relatively high concentrations of one or more impurities such as naphthenic acids, sulfur, and/or nitrogen. Another advantage of the present invention is that crude and crude fractions containing one or more of such naphthenic acid, sulfur, and/or nitrogen impurities may be readily processed.

In a preferred embodiment, wherein the feed comprises crude or atmospheric resids that contain appreciable amounts of 1050° F.+ (565° C.+) resids, e.g., 10 wt % or more of resid, or 20 wt % or more of resid, the resid-containing feed, after hydroprocessing, may be passed into the convection section of a pyrolysis unit, where it is heated. Then the heated feed may be passed to a visbreaker or other vapor liquid separation device. Preferably, such device is heat-integrated with the pyrolysis unit, to drop out the heaviest fraction (e.g., substantially the asphaltenes and 1050° F.+ (565° C.+) fractions). Heat integration provides added efficiency to the visbreaker or separator.

In addition to the incipient thermal cracking of the resid fractions that occurs during hydroprocessing, a significant portion of additional cracking, conversion, and flash separation that occurs within the visbreaker/separator. This further cracking and conversion is caused by applying unconventionally high separating/visbreaking temperatures for an unconventionally short contact time, thereby minimizing or controlling coking to an acceptable level. When the resid-containing feed is heated to less than about 650° F. (343° C.) and even up to only about 700° F. in the convection section and the feed has a relatively short residence time in the liquid-vapor separation device, such as is typical with conventional resid hydrogenation processes, little to no thermal cracking may occur and generally only molecules that vaporize at these conditions can be separated. e.g., generally non-resid type components. However, when the resid-containing feed is heated to above 700° F. (371° C.) as according to the present invention, preferably above 750° F. (399° F.), still more preferably above 780° F. (415° C.) in the convection section and has a longer residence time in the liquid-vapor separation device, some substantial, further thermal cracking of the resid fractions occurs. To maximize conversion of resid to lower boiling fractions, it is desirable to begin cracking the resid fractions as early in the process as possible. According to the present invention, incipient thermal cracking is initiated in the hydroprocessing unit, then further thermal cracking is supported in the visbreaking/separating step, thus maximizing the portion of the feed that is vaporized. It is theorized that the increased concentration of lower boiling fractions created earlier in the process help assist or promote the further breaking, cracking, and/or conversion of the resid to lower boiling fractions. This includes conversion and cracking of resid fractions having boiling points of up to and in excess of 1100° F.+ (593° C.) fractions, and even a portion of the resid fractions up to 1400° F. (760° C.).

When the effluent from the hydroprocessing unit is heated (including reheated) to above to 780° F. (415° C.), such as from 780° F. (415° C.) up to about 900° F. (482° C.), and processed in a visbreaker or other separator, still more thermal cracking of the 650° F.+ (343° C.+) resid fractions occurs, including those resid fractions having a boiling point of up to and in excess of 1050° F.+ (565° C.). At the higher temperatures closer to 900° F., the residence time may be shortened to a contact time that is unconventionally short as compared to prior art hydroprocessing or residfining contact time.

Surprisingly, this occurs without the formation of substantial quantities of coke, fouling, or solids in the unconverted 1050° F.+ (565° C.) resid. This type of thermal cracking and vapor liquid separation process may be described as "visbreaking." Preferably the separation and heating are integrated processes. The term "integrated" as used herein means "heat integrated," in that the vapor liquid separation device or visbreaker is connected to the steam cracker by piping and is located substantially adjacent or relatively close to the steam cracker, such that the feed may be heated in the convection section of the cracker, fed to the visbreaker, and then the overheads from the visbreaker are fed back to the cracker, with minimal heat loss and preferably without requiring separating heating of the visbreaker.

The vapor liquid separation device is otherwise known as a "visbreaker," "knock-out drum," "knock-out pot," and "vapor liquid separator," which terms may be used interchangeably. Reference is also made herein to the "visbreaker," which serves as a vapor liquid separation device, with the distinguishing feature that it generally operates at a higher temperature than some of the other separators to also facilitate some further thermal breaking and cracking of the feed. The terms "flash drum," "flash pot," "visbreaker," "vapor liquid separator," and "flash separator" are also well known terms having generally like meaning and may be used herein substantially interchangeably. e.g., a knock-out pot may also be referred to as a visbreaker, or as a vapor-liquid separator. The term "flash" means generally to precipitate a phase change for at least a portion of the material in the vessel or stream from liquid to vapor, via a reduction in pressure and/or an increase in temperature. Thus, "flash separation" may occur in a "flash drum" due to a reduction in pressure at the inlet to or within the drum.

In a more preferred embodiment the material is treated by visbreaking or mild thermal cracking to increase the proportion of vapor phase at the expense of bottoms product. In some of the separation processes, such as in the high pressure separators and/or the flash separators, the feed material also may be separated into a bottom, substantially liquid fraction, and an overhead, substantially vapor phase fraction. The bottoms or liquid phase may include a resid fraction therein. The vapor fraction may also contain components derived from the resid fraction. Preferably, both the bottoms fraction and the vapor fraction effluents each contain components derived from the resid fraction, though the composition of the resid fraction of the bottoms effluent will be different from the vapor effluent. Thereby, each of the vapor stream and bottoms stream may be steam cracked.

Visbreaking is a well-known, non-catalytic, mild thermal cracking process that uses heat to convert or crack heavy hydrocarbonaceous oils and resids into lighter, sometimes more valuable products, such a naphtha, distillates, and tar, but not so much heat as to cause carbonization. The hydrocarbon feed may be heated, such as in a furnace or soaker vessel to a desired temperature, as a desired pressure. The process used may be, for example, the coil type, which provide for high temperature-short residence time, or the soaker process, which provides for lower temperature—longer residence time processing, as appropriate to obtain the desired broken product mix. The hydrocarbon feed stream may be heat soaked to reduce the viscosity and chain length of the hydrocarbon molecules, by cracking the molecules in the liquid phase. See, for example, Hydrocarbon Processing, September 1978, page 106. Visbreaking occurs when a heavy hydrocarbon, or resid, is heat soaked at high temperature, generally from about 700° F. (371° C.) to about 900° F. (371° C. to about 482° C.) for several minutes before being quenched to stop the reaction. Some of the resid molecules crack or break producing components that can be removed by standard atmospheric and vacuum distillation. Resid conversion in a visbreaker increases with increasing temperature and increasing residence time. High severity visbreaking maximizes conversion of 1050° F.+ resid and is accomplished by soaking the visbreaker feedstock at greater than about 840° F. (450° C.) for the longest time reasonably possible, without forming substantial coke or carbonization.

It is a key aspect of the present inventors that, surprisingly, higher than previously known visbreaking conversions can be accomplished on resid-containing crude streams or fractions that have been first severely hydroprocessed, e.g., crudes that are highly hydrogen saturated and a substantial portion of the resid is already cracked) as compared un-hydroprocessed heavy crudes. The inventive, improved visbreaking process and behavior is believed to be due to the high hydrogen content of the resid portion of the hydroprocessor effluent and due to the increased lighter ends produced by the initial cracking that is performed in the hydrogenation process.

In one preferred embodiment of the present invention, particularly severe visbreaking, e.g., visbreaking at temperatures in excess of 800° F. (427° C.), is caused to occur in the vapor liquid separation device (visbreaker), preferably with the device integrated (heat integrated) with the steam cracker as described herein. The integrated vapor liquid separation device can be taken off stream as often as every two weeks for coke removal. This enables the separation device to operate with a significantly higher coke yield than typical visbreakers, which may be required to run several months between shut downs for coke removal, due at least in part to the complexity and time required for decoking of such systems. The visbroken vapor overheads, which include fractions from the cracked resids, may then be fed to the steam cracker for further cracking into other products, including light olefin streams.

While lighter visbroken resid molecules (particularly resid materials having boiling points of less than 750° F. (<400° C.)) vaporize without additional processing, steam stripping may be necessary and helpful to vaporize heavier visbroken molecules e.g., boiling points in excess of 750° F. (>400° C.). The visbreaking reactions are rapid enough that purge steam and/or light hydrocarbons may be added to the vapor liquid separation device to strip the visbroken molecules. This increases the fraction of the hydrocarbon vaporizing in the vapor liquid separation device. Heating may also be used to increase resid conversion.

Visbreaking may be controlled by modifying the residence time of the liquid phase within the vapor liquid separation device. In one preferred embodiment, the liquid phase level may be raised to substantially fill the head space of the vapor liquid separation device, thus increasing residence time of the resid molecules to an extent sufficient to affect at least partial visbreaking. Preferably the visbreaker is at least half (50%) full of liquid, more preferably, at least 75% full of liquid, and in some embodiments most preferably at least about 90% full of liquid, based upon the total volume of the vessel. The addition of heat may also accelerate visbreaking in the liquid phase, the liquid residue of which collects as bottoms in the lower portion of the vapor liquid separation device. In one embodiment of the present invention, a heater in the lower section of a vapor liquid separation device is used in conjunction with the convection section of a steam cracking furnace, to provide additional heat, if needed. The added heat may help keeps the resid hot enough to continue the reaction and effect significant visbreaking conversion or the 750° F. (399° C.) to 1050° F. (565° C.) resid.

Preferred vapor liquid separation devices or flash drums, and their integration with pyrolysis units have previously been described in U.S. Patent Application Publication Nos. 2004/0004022, 20040004027, and 2004/0004028, and more recently in U.S. application Ser. Nos. 11/068,615 filed Feb. 28, 2005, 10/851,486 filed May 21, 2004, 10/851,546 filed on May 21, 2004, 10/851,878 filed May 21, 2004, 10/851,494 filed on May 21, 2004, 10/851,487 filed May 21, 2004, 10/851,434 filed May 21, 2004, 10/851,495 filed May 21, 2004, 10/851,730 filed May 21, 2004, 10/851,500 filed May 21, 2004, 11/134,148 filed May 20, 2005, 10/975,703 filed Oct. 28, 2004, 10/891,795 filed Jul. 14, 2004, 10/891,981 filed Jul. 14, 2004, 10/893,716 filed Jul. 16, 2004, 11/009,661 filed Dec. 10, 2004, 11/177,076 filed Jul. 8, 2005; and 11/231,490, filed Sep. 20, 2005. Another preferred apparatus effective as a vapor liquid separation device for purposes of the present invention is described in U.S. Pat. No. 6,632,351 as a "vapor/liquid separator," e.g., a visbreaker. Visbreaking is discussed in the aforementioned U.S. patent Ser. Nos. 10/851,486; 11/134,148; 11/009,661.

In the process of the present invention, the visbreaker or vapor liquid separation device preferably operates at a temperature of between about 700° F. (371° C.) and 900° F. (482° C.), more preferably from about 750° F. (399° C.) to about 900° F. (482° C.), still more preferably from about 780° F. (415° C.) to about 900° F. (482° C.), and most preferably from about 800° F. (427° C.) to about 875° F. (468° C.). Passing the hydroprocessed and partially cracked resid-containing material through the vapor liquid separation drum, while experiencing some pressure reduction therewith, to obtain an overhead vapor and liquid bottoms may also be referred to herein as "flashing" (or "flashed" or other variant depending on the context).

Another aspect of the invention relates to the API gravity and sulfur content of the steam cracker feedstock. It is known that steam cracker quality improves with increasing API gravity and decreasing sulfur content of the feed. The present inventors have surprisingly discovered that feedstocks rich in sulfur and in high boiling, polynuclear naphthenes, polynuclear aromatics, and partially saturated polynuclear aromatics, which tend to have lower API gravity, can be preferred feedstocks to a steam cracker when first hydroprocessed.

It is also well known in the art that the specific gravity and sulfur content of crude oils increase with increasing boiling point. For this reason, feedstocks rich in the vacuum resid from a crude oil with 15 to 40 API gravity and 1 to 4 wt % sulfur may be some preferred feedstocks for the process of the invention. Resid hydrotreating removes the sulfur throughout the entire boiling range of the feedstock. Large amounts of hydrogen are consumed removing the heteroatoms from the vacuum resid and saturating polynuclear aromatics contained in the vacuum resid. Resid hydroprocessing can be accompanied by both catalytic and thermal cracking of resid molecules into components that can be separated by standard fractionation. Originally the inventors searched for resid hydroprocessing conditions that obtained greater than 50% 1050° F.+ conversion and greater than 90% sulfur removal. The inventors surprisingly invented a process whereby the 1050° F.+ conversion in the residfiner (resid hydroprocessor) was not necessary because this function could be readily accomplished by visbreaking the residfiner effluent in a separate step.

Resid hydroprocessing is used commercially in other refining processes to pretreat atmospheric resids (containing 25 to 35 wt % vacuum resid) for use as feedstock to an FCC unit. In this process, the coke yield on the hydroprocessed resid is typically 5 to 8 wt %. This means that 92 to 95% of the resid feed to the integrated residfiner and FCC unit is converted to liquid and gas hydrocarbon products and only 5 to 8 wt % is lost as low value coke.

The inventors were surprised to discover that similar results could be achieved by integrating resid hydroprocessing, visbreaking, and steam cracking for the production of olefins. In the process of the invention, hydroprocessed resid is visbroken and the vaporized overheads from the visbreaker are steam cracked. The inventors have surprisingly discovered that such a process produces 6 to 9 wt % visbreaker bottoms (analogous but higher value than the coke produced in the FCC case), and 91 to 94 wt % steam cracker products.

To take full advantage of the visbreaking capability of the process of the invention, preferred feedstocks may contain, in embodiments, 20 to 50 wt % vacuum resid, and some feeds may even be whole crudes. Resid hydroprocessing consumes large amounts of hydrogen. The inventors were concerned that hydrogen would be incorporated into the vacuum resid feed and yield a hydroprocessing effluent material only useful as fuel oil, having a lower value than the value of desired chemicals products (e.g., light olefins). As previously mentioned, an objective of the process of the invention is to increase the hydrogen content of the steam cracker feed while minimizing the increase in hydrogen content of the remaining resid, which is typically sold as low-value fuel oil. The integration of severe hydroprocessing and visbreaking surprisingly accomplishes this objective. Visbreaking effectively removes high hydrogen content side-chains from cores made from polynuclear naphthenes and aromatics. Full conversion in a visbreaker is limited by limiting the temperature and controlling the residence time, thereby avoiding the excessive formation of coke or fouling the equipment.

Crude or a resid-containing fraction thereof, particularly atmospheric resid, vacuum resid, or any resid or asphaltene containing refinery or chemical intermediate stream may also be a preferred feed to the hydroprocessor for the inventive process. When the feed comprises greater than about 0.1 wt %, or preferably greater than about 5.0 wt % asphaltenes, a vapor liquid separation device is advantageously used to remove the asphaltenes prior to entering the radiant section of the pyrolysis unit. Preferably, the vapor liquid separation device (visbreaker) may advantageously be heat integrated with the pyrolysis unit, as discussed above, so that the feed is preheated in the convection section of the pyrolysis unit prior to entering the vapor liquid separation device. Thus, the term "integrated vapor liquid separation device" as the term is used herein. In the alternative, the vapor-liquid separation device may be substantially non-heat integrated with the cracker, so that the visbreaker has its own separate or a supplemental heat source such that removal of asphaltene and any non-saturated or non-cracked resid occurs prior to the feed entering the radiant section of the pyrolysis unit. Both integrated and non-integrated configurations are within the scope of the present invention.

Preferred feeds may include a hydrocarbon feedstream having a high concentration of tar, and crude fractions such as topped crude ("topped crude" being the cut roughly from about 500-600° F. (260-315° C.) and higher cut). Often topped crude is used as a synonym for atmospheric resid. This preferred feed may or may not contain appreciable amounts of resid. However, any crude or resid containing crude fraction may be advantageously treated according to the process of the present invention to obtain chemicals products (light olefins and/or single ring aromatics) regardless of the amount of resid contained therein.

The following examples are meant to illustrate and not limit the present invention. Numerous modifications and variations are possible and it is to be understood that within the scope of the appended claims, the invention may be practiced otherwise than as specifically described herein.

In the figures that follow, "HDP" is a hydrotreating apparatus, "HPS" is a high pressure separation device (e.g.,: drum with liquid level control that separates gas and liquid under pressure), "Steam Cracker" is a thermal pyrolysis apparatus, and "Steam Cracker Product Recovery" is a system that comprises one or typically several separation steps, e.g., distillation columns. All of these apparatus or systems taken separately may be substantially conventional apparatus and are, separately, known in the art.

Referring to the exemplary Figures, FIG. 1 is a process flow diagram illustrating an embodiment of the invention where a resid-containing feed 8 is hydroprocessed in a hydroprocessing unit 10 and then passed to a steam cracker 20 to obtain various products 41-44, including olefins 42. The design details of the steam cracker 20 by itself are not the subject of the present invention. Processing conditions typically may be readily determined by one of ordinary skill in the art. Non-conventional steam cracking designs known in the art, such as furnaces that are heated by direct mixing of super-heated solids or gasses with the liquid feedstock comprising resid, are also contemplated by the inventors as being useful in the invention set forth herein.

One embodiment of the inventive process of preparing a resid-containing feed for steam cracking comprises severely hydroprocessing the feed by hydroprocessing the feed at temperature in excess of 700° F. (371° C.), preferably greater than 750° F. (399° C.), and more preferably in excess of 780° F. (415° C.). The process also comprises further improving the hydroprocessor effluent by holding, heating, and further converting the effluent in a visbreaker type vapor-liquid separator. Preferably the visbreaker is heat-integrated with the steam cracker. In the heat integrated process as illustrated by FIG. 1, atmospheric resid 8 is passed to a conventional hydroprocessor (HDP) 10, such as a fixed bed hydroprocessor. Numerous HDP units are commercially available, varying by catalyst and configuration, among other variables, such as available from ExxonMobil. The design details of an HDP by itself are not the subject of the present invention. Processing conditions for the HDP typically may be readily determined by one of ordinary skill in the art. Petrochemicals recovery (light olefins and aromatics) will be largely affected by processing conditions chosen in the HDP 10, the visbreaker type vapor liquid separator 30, and also in the steam cracker 20.

The hydrogenated feed 14 from the HDP unit is then passed to one or more separation devices (not shown) to recover hydrogen, let down the pressure and reduce the temperature. The stream comprising hydrogen and light carbon products, e.g., C2 and lower, may be recycled 12, and a hydrogenated effluent stream 14 comprising products from C2 boiling range (C2+) and higher (e.g., up to 1500° F.) is recovered for further processing. Note that in many cases the recycle stream 12 may contain $H_2S$, which is preferably removed, such as by membrane(s), absorbent(s), and the like, prior to entering the HDP unit 10. A bottoms stream from the HPS (not shown), may be split into two or more streams. In addition to being used for the process of the invention, the bottoms stream (not shown) can be recycled to the resid hydroprocessor 10 or further processed by conventional distillation and refining.

In the case where the feed 14 still contains asphaltenes, these may be advantageously removed prior to entering the radiant section 24 of the steam cracker 20. Examples of removal of the asphaltenes are discussed more fully above and also in examples below. Although not shown in detail in FIG. 1, the hydrogenated C2+ stream 14 may be preheated in the convection section 22 of the steam cracker 20 prior to being passed to a vapor liquid separation device 30, wherein (nominally) 1050° F.+ resid, comprising asphaltenes if not previously removed, may be removed as bottoms product 32 from the vapor liquid separation device 30. The vapor 34 is passed back to the convection section 22, preferably without cooling or condensing. The apparatus schematic designated "S/C furnaces" 20 in FIG. 1 is the conventional illustration of a steam cracker furnace, the details of which, again, are not the subject of the present invention except for the integration of the vapor liquid separation device 30, which has been described in the references discussed elsewhere herein. The separation device 30 preferably functions as a visbreaker, in that the device 30 separates temporarily holds and further heats a stream that has been previously heated in the hydroprocessor, Thereby, initial cracking is caused in the hydroprocessor, creating some lighter fractions, and then subsequent cracking is caused in the visbreaker, supplemented by the light ends created in the hydroprocessor, by the steam injected into or ahead of the visbreaker, and optionally by the flashing pressure drops. The separator 30 is also preferably heat integrated with the cracker 20, in that the separator is located close enough to the steam cracker 20 that preferably no additional or separate heat is needed for the separator to facilitate the visbreaking type separation in the separator 30. Thereby, the separator 30 may be "integrated" with the steam cracker 20.

Although not shown in detail in FIG. 1, in a preferred embodiment, the hydrogenated C2+ stream 14 is heated in the convection section 22 of the steam cracker 20 at a sufficient temperature to initiate thermal cracking of the hydrogenated resid prior to being passed 33 to a vapor liquid separation device, wherein (nominally) 1050° F.+ resid, comprising asphaltenes, is removed as bottoms product 32 from the vapor liquid separation device 30. Steam (not shown) can be added to the vapor liquid separation device to increase the fraction of the feedstock removed as vapor 34. The residence time of the liquid in the vapor liquid separation device 30 can be increased to increase the fraction of the feedstock removed as vapor 34. It is a further inventive aspect of this invention that raising the liquid level in the visbreaker separator may increase liquid residence time to further increase conversion of the resid fractions, for a given treating temperature (particularly the higher boiling resid). The visbreaker comprises a vapor liquid separation vessel or device that separates the vapor fraction from the liquid fraction, and wherein the separation vessel includes a liquid volume that preferably occupies at least 50% of the volume of the vessel. Preferably, the liquid level of the separation vessel will be at least about equal to or greater than 75% by volume of the vessel, still more preferably greater than about 80%, and most preferably greater than about 90% of the vessel volume.

The vapor 34, including resid molecules that have been thermally cracked (also known as destructive distillation), may be passed back to the convection section 22. In this way the convection section 22 of the steam cracker 20 may convert 1050° F.+ vacuum resid to lighter molecules. Ultimately, fuel oil yield is reduced and petrochemicals yields (e.g., the desired light olefins and single ring aromatics) are increased. If the temperature is too high or the residence time of the feedstock is too long, in the hot visbreaker vapor liquid separation device 30, coke formation may initiate. If this happens, the process may undesirably fill the vapor liquid separation device 30 with coke, which necessitates shutting down the process. In a preferred embodiment, the temperature and residence time in the vapor liquid separation device 30 are controlled to allow only a small amount of coking. For example, every 15 to 40 days the steam cracker may be shut down to readily remove an acceptable amount of coke from the radiant section 24 of the furnace 20, the lines, and/or from the separator 30, if necessary. The process of the invention may use known methods and facilities to remove coke from the vapor liquid separation device 30 and the piping in the convection 22 and radiant 24 sections of the steam cracker furnace 20. Because of this synergy between visbreaking and steam cracking, the process of the invention can visbreak the resid in the feedstock at a higher severity than conventional visbreakers, which are designed to run for several months before decoking is required.

The apparatus schematic designated "S/C furnaces" 20 in FIG. 1 is the conventional illustration of a steam cracker furnace, the details of which, again, are not the subject of the present invention except for the integration (not shown in FIG. 1) of the vapor liquid separation device, which has been described in the references discussed elsewhere herein.

In another embodiment, all or any fraction of the hydroprocessor effluent 14 comprising 1050° F.+ (565° C.+) resid may be heated in a steam cracker 20 or by separate heat source, to a temperature high enough to initiate thermal cracking but low enough to avoid significant coking. The cracked stream may be held at this temperature for a long enough time to achieve from about 5 wt % (low severity) to about 60 wt % (high severity) conversion of the 1050° F.+ resid (i.e., conversion of material from higher boiling resids, including the 1050° F. (565° C.) resids to lower boiling point material), but short enough to avoid significant coking. The optimal temperature and time ("time at temperature") is different for each specific feedstock and can be determined by one skilled in the art without more than routine experimentation. The time at temperature is selectively ended by quenching the hot bottoms material to prevent fouling or coking. Those skilled in the art in possession of the present disclosure would recognize this generally as visbreaking. In the visbreaking vapor liquid separation step, wherein (nominally) the unbroken 1050° F.+ resid and/or asphaltenes are removed as bottoms product from the vapor liquid separation device, and all or a fraction of the visbreaker vapor effluent 34, is passed to the steam cracker 20, and preferably to the convection section 22 prior to entering the radiant section 24. The separated vapor is further processed and cracked in the radiant section 24 to yield steam cracker effluent 26 comprising the desired light olefins 42.

It is one of the important advantages provided by the present invention that by means of the high severity hydroprocessing and visbreaking of the hydroprocessor effluent 14, whether in a visbreaker configured prior to the steam cracker and having supplemental or separate heat source, or integrated with the steam cracker, that high conversion, such as at least 50 wt % or even greater than 50 wt %, such as up to 55 wt % and even up to about 60 wt % of the hydrogen-rich 750° F.+ (399° C.+) resid and even a significant portion of the 1050° F.+ (565° C.+) material, can be achieved. This provides a steam cracker feedstock 34 (or feedstock to the radiant section 24, in the case of the visbreaker integrated with the convection section 22 of the steam cracker) having greater than 13 wt % hydrogen. The bottoms product 32 of the visbreaker device 30, which in some embodiments may comprise less than 11.5 wt % hydrogen, may be used as fuel oil and/or recirculated to the hydroprocessor, or fed to another processing unit, such as a catalytic conversion system.

Figure 6:
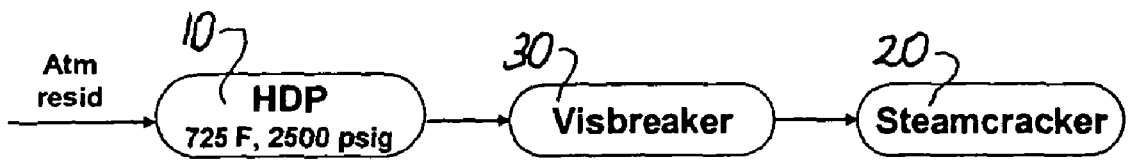

In an embodiment, illustrated by the schematic shown in FIG. 6, the process of the invention integrates the steps of resid hydroprocessing 10, hydroprocessed resid visbreaking 30, and steam cracking 20. Conventional visbreakers can be operated to perform the operational parameters of the present invention, to separate a distilled vapor and/or liquid from unconverted resid feedstock. The distilled liquid and/or vapor from the resid hydroprocessor 10 and/or the visbreaker 30 are processed in a steam cracker 20 to produce petrochemicals. At least one significant advantage of this embodiment is that there is no need to directly integrate a vapor liquid separation device with the convection section of the steam cracker 20.

The product of the steam cracker 20 is sent to the steam cracker product recovery section (not shown in FIG. 6) where various products may be recovered by separation, typically by distillation. The "chemicals" stream comprises ethylene, propylene, and butenes. The separations are per se conventional and not the subject of the present invention.

Certain variations will immediately become apparent to one of ordinary skill in the art. As an example, one or more of the vapor liquid separation device may be exchanged with other separation devices, such as membranes and integration with the steam cracker, while a preferred embodiment, is optional. Removal of the asphaltenes, however, is highly preferred prior to the radiant section of the thermal pyrolysis unit (steam cracker). Membranes are particularly useful to separate, for instance, polar from non-polar species (for instance, prior to the HDP unit).

In the embodiment shown in FIG. 6, where the process of the invention integrates the steps of resid hydroprocessing 10, hydroprocessed resid visbreaking 30, and steam cracking 20, conventional visbreakers can be operated to separate a distilled vapor and/or liquid from unconverted resid feedstock. The distilled liquid and/or vapor from the resid hydroprocessor and/or the visbreaker are processed in a conventional steam cracker to produce petrochemicals. At least one significant advantage of this embodiment is that there is no need to directly integrate a vapor liquid separation device with the convection section of the steam cracker.

Figure 2:
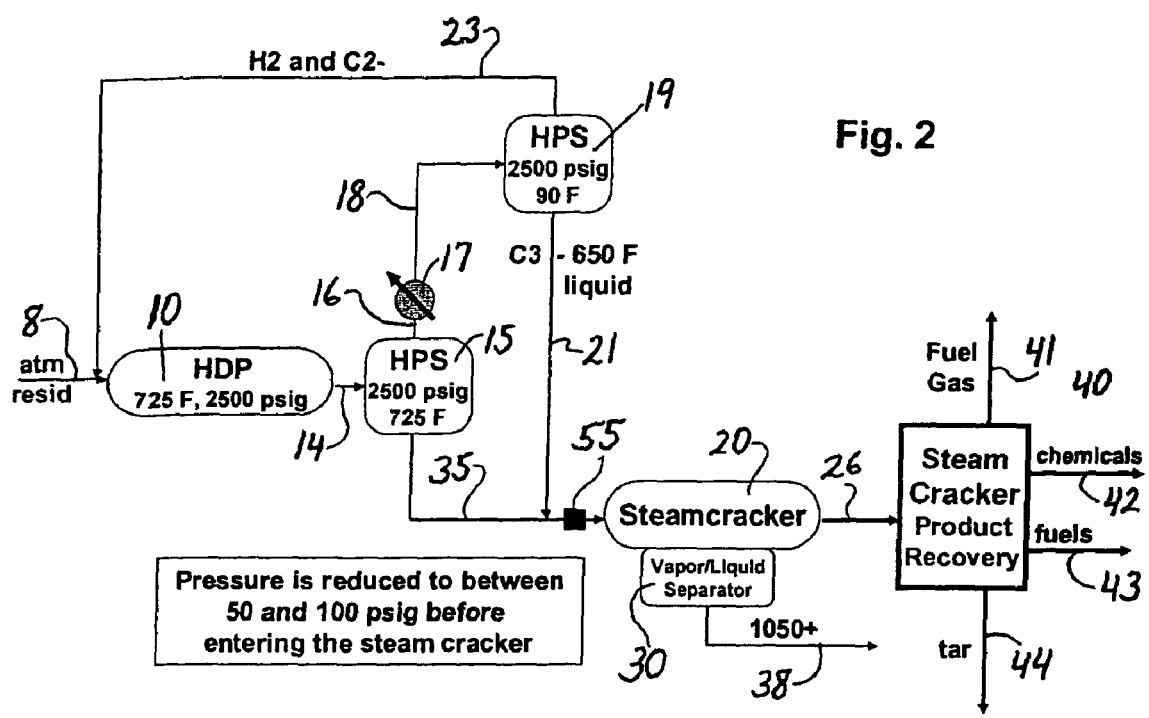

FIG. 2 is a process flow diagram illustrating an embodiment of the invention where a resid-containing feed 8 is hydrotreated 10 and then passed 14 to a steam cracker 20 to obtain various products including olefins.

In an embodiment of the process illustrated by FIG. 2, a feed 8, which in a preferred embodiment is atmospheric resid, is passed to a conventional hydroprocessor (HDP) 10, such as a fixed bed hydroprocessor. Again, the design details of the HDP are not per se the subject of the present invention. Illustrative processing conditions are provided in FIG. 2 for the HDP step 10, however as would be recognized by one of ordinary skill in the art, these may vary and may be determined by routine experimentation. Actual conditions for the one or more HDP apparatus will vary in accordance with the specific feed and/or desired products in integration with the steam cracker conditions and visbreaker conditions, but good starting point would be 2200±500 psig (total pressure), 725±100° F. (measured at reactor outlet), 3000±200 SCFB hydrogen processed at 0.1 to 0.3 WHSV.

The hydrogenated feed 14 is passed to a high pressure separator 15 operating at the conditions such as specified in FIG. 2, which may, again, vary and be determined by one of ordinary skill in the art by routine experimentation, depending on the feed and the operating conditions of the other apparatus in the system shown. The overheads 16, passing through a heat exchanger 17 illustrated in the conventional manner of a circle with arrow passing through, may consist of distillate boiling at, for example, 650° F. and below. The cooled overhead 18 may be sent to a second HPS 19, as illustrated in FIG. 2, separating the stream at the 90° F. point, as shown, to yield a bottoms 21 comprising C3 material and higher carbon numbers (including naphtha and heavy distillate), which may be passed to the steam cracker 20, and an overheads 23 comprising hydrogen, methane, ethane, and $H_2S$, the overheads being recycled, preferably after removal of $H_2S$ by, for instance, membrane, absorbent, and the like.

In the exemplary embodiment described and illustrated in FIG. 2, the bottoms 35 from the first HPS 15 may comprise the material boiling above 650° F. In some embodiments, the bottoms 35 may be recycled or mixed with the bottoms 21 of the 2$^{nd}$ HPS 19 and then depressured 55. In practice, typically a portion (such as 0 to 90 wt % or 40 to 60 wt %) will be recycled (not shown) and a portion 35 (such as 10 to 100 wt % or 40 to 60 wt %) will be mixed and depressured. Mixing with the 90° F. liquid cools the liquid 35 from the first HPS 15 reducing the amount of flashing that occurs upon depressuring.

In another embodiment, the combined liquid effluents 14 from the resid hydroprocessor 10, comprising resid and for example, Vacuum Gas Oil (VGO), may be preheated in the convection section of the steam cracker 20 and then the vapor from the integrated vapor liquid separation device is passed back into the convection section and then introduced or passed into the radiant section of the steam cracker, where it is cracked. The bottoms from the integrated vapor liquid separation device, consisting of (in the present preferred embodiment) 1050° F.+ cut, comprises asphaltenes.

The product 26 of the steam cracker 20 may be sent to the steam cracker product recovery section 40, where various products 41-44 may be recovered by separation, typically by distillation, as shown in FIG. 2. The "chemicals" stream 42 comprises, for example, ethylene, propylene, and butenes. Each steam cracker 20 may be integrated with its own product recovery apparatus 40 or a single product recovery unit 40 may handle both steam cracker effluents 26, 38.

Certain variations will immediately become apparent to one of ordinary skill in the art. As an example, other separation devices, such as membranes or vacuum towers, can be added. Membranes are particularly useful to separate, for instance, polar from non-polar species (for instance, prior to the HDP unit) or aromatic from non-aromatic species (for instance, after the second HPS unit in FIG. 2 and prior to the steam cracker, passing non-aromatics to the steam cracker and recycling aromatics to the hydroprocessing unit).

Figure 3:
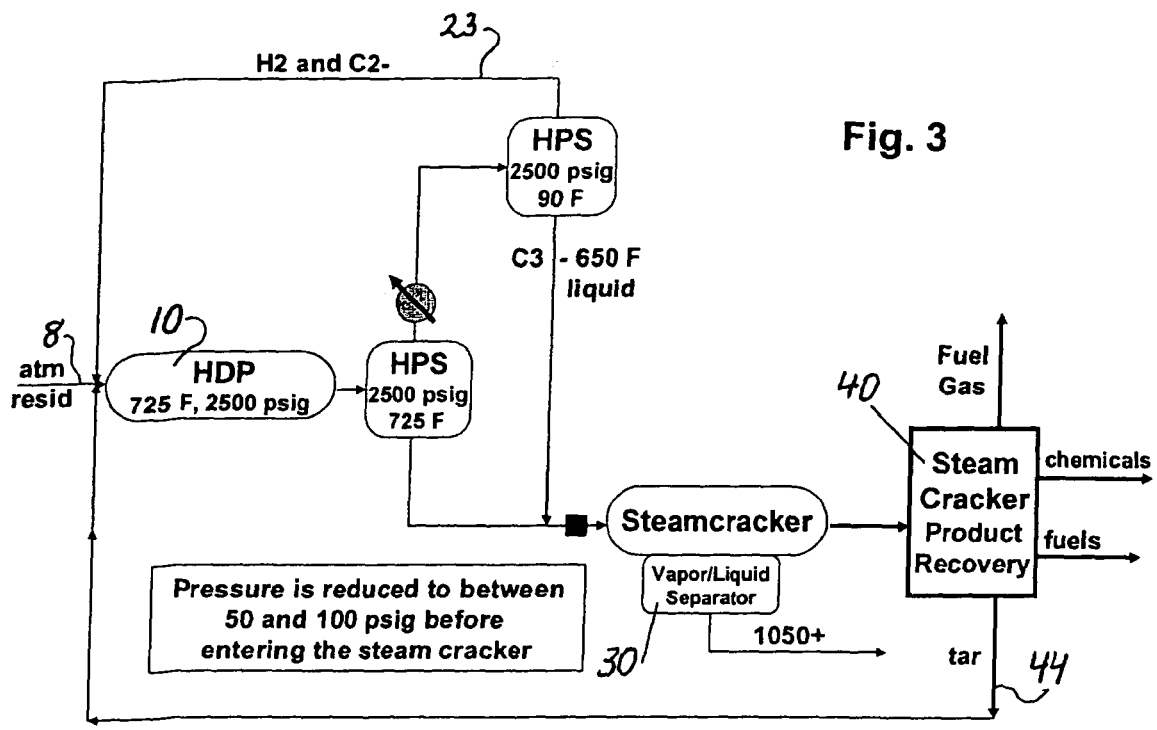

FIG. 3 illustrates another preferred embodiment of the invention. FIG. 3 is similar to FIG. 2 except in FIG. 3, tar 44 from the product recovery unit 40, heated to about 100° C. to about 200° C. to maintain fluidity, and now containing substantially no metals and comprising very little sulfur, may be passed to the HDP 10, preferably being diluted with one or more of the 650° F.+ recycle 23 and/or feed 8, or portion of one or both of these materials.

Figure 4:
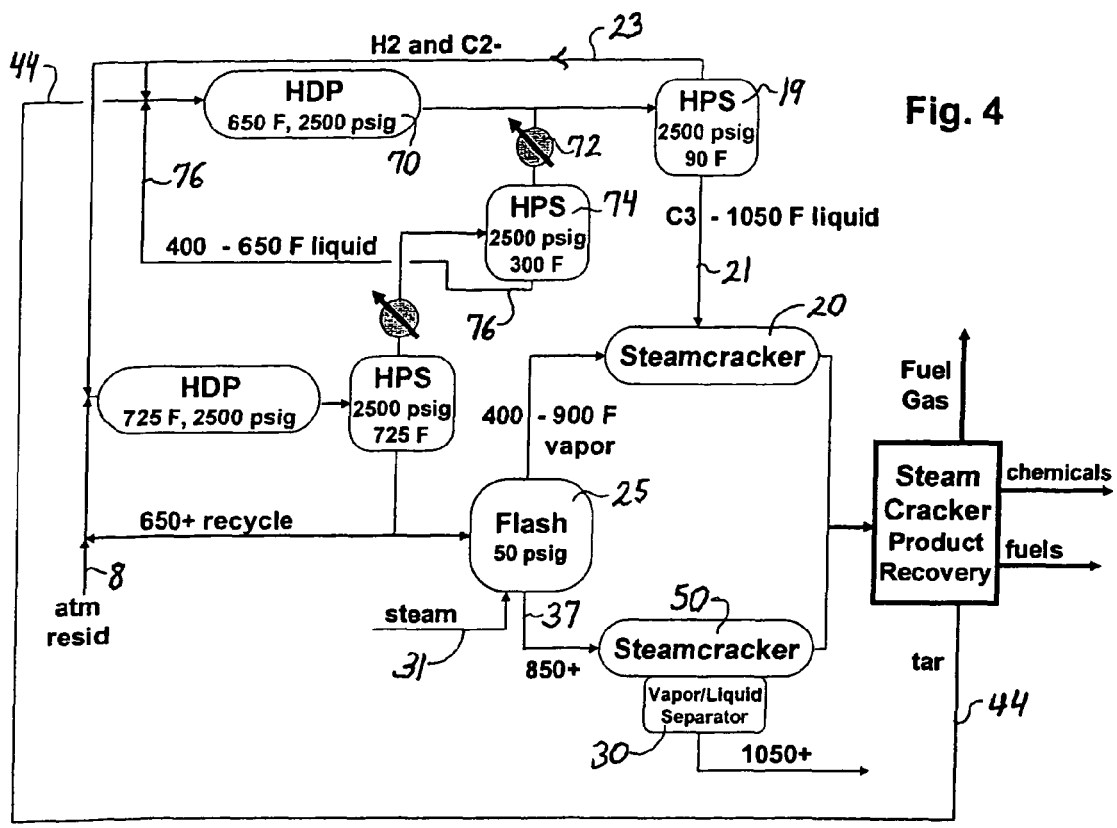

FIG. 4 illustrates still another embodiment of the invention. FIG. 4 is similar to FIG. 3, except a second HDP unit 70, a second heat exchanger 72, and a third HPS unit 74 is provided. As shown in FIG. 4, material 76 from the third HPS unit 74 (e.g. 400-650° F. (204-343° C.) liquid) is sent as feed to the second HDP unit 70. Tar 44 is optionally recycled to the second HDP unit 70. FIG. 4 further employs a vapor liquid separation device 25 (Flash in FIG. 4) to separate the about 900− 36 from the about 900° F.+ 37 resid. The 900° F.− vapor 36 (mixed with steam 31) may be passed directly to conventional steam crackers 20 without an integrated vapor liquid separation device. The about 900+ resid 37 may be passed to steam crackers 50 that comprise an integrated vapor liquid separation device 30 to be subjected to visbreaking. The vapor liquid separation device 30 can be operated at a variety of conditions as is readily understood by those skilled in the art. In another variation (not shown) a portion of the tar 44 can be mixed with the atmospheric resid 8 and a portion mixed with the bottoms product 76 of the third HPS unit.

It will be recognized by one of ordinary skill in the art in possession of the present disclosure that a visbreaker may be arranged prior to one or more of the steam crackers in any one of FIGS. 1-4 discussed above. With the visbreaker step before the thermal pyrolysis step, in accordance with the present invention, the vapor liquid separation device, integrated with the thermal pyrolysis furnace, becomes optional. This can be illustrated by reference to the following example as well as additional figures described below.

Figure 5:
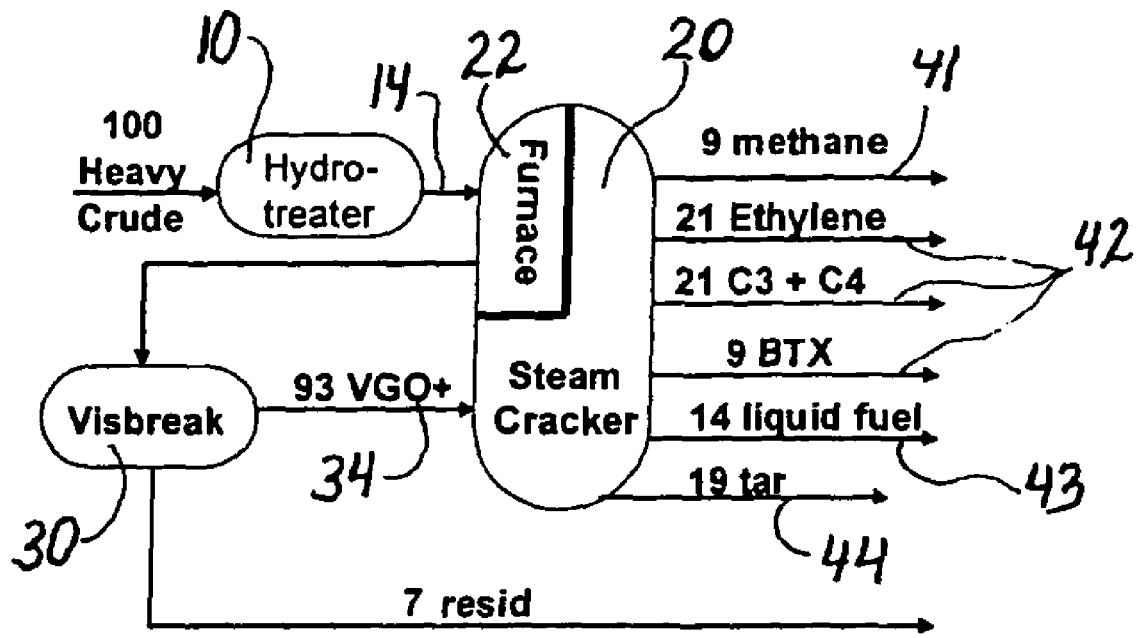

Referring to FIG. 5, visbreaking is accomplished in a vapor liquid separation device 30 integrated with the steam cracker 20. In an example illustrated in FIG. 5, crude oil was distilled at about 1 atmosphere pressure until the remaining oil reached 600° F. (about 315° C.). The heavy oil (resid) is analyzed (see Table 1). The heavy oil (resid) was mixed with hydrogen and passed through a hydroprocessor 10, processed at 0.2 WHSV, 695° F., and 2000 psig total pressure. The hydroprocessor effluent 14 is analyzed (see Table 1). The liquid product 14 from the hydroprocessor is then subjected to vacuum distillation (not shown in FIG. 5) to separate the vacuum resid. The distillation yields 82 wt % distillate (1050−) and 18 wt % vacuum resid (1050+). The analysis is provided in Table 1.

The results of visbreaking 30 the 18 wt % vacuum resid (nominally given as 17 wt % 1050° F.+ hydroprocessor effluent in Table 1 below but also to include such species as sulfur-containing compounds) can be estimated. Due to the high hydrogen content (12.5 wt %) of the feedstock 14, high conversions in the visbreaker 30 are possible before the onset of substantial coke formation. Severe visbreaking will produce 40% yield of vacuum resid containing up to 10.8 wt % hydrogen and a 60 wt % yield of overheads with a hydrogen content of 13.5 wt % H. The calculated hydrogen (H) content of the visbreaker 30 overheads 34 is close to the H content of the distilled residfiner liquids. Thus, it can be assumed that addition of the visbreaker overheads 34 to the distilled hydroprocessed liquids will not significantly change steam cracking yields. The 84 wt % distillate material from the resid hydroprocessing step may then be used as steam cracker feedstock. The yields from steam cracking are provided in Table 2.

TABLE 1

|  | Crude Atm Resid | Hydroprocessor Effluent | 1050− | 1050+ |
| --- | --- | --- | --- | --- |
| API Gravity | 17.8 | 27.0 | 30.0 | 17.5 |
| wt % H | 11.3 | 12.9 | 13.1 | 12.5 |
| wt % S | 4.2 | 0.15 | 0.01 | 0.3 |
| wt % C5− | 0.0 | 3.0 | 5.0 | 0.0 |
| wt % C5-1050 F. | 64.0 | 80.0 | 95.0 | 0.0 |
| wt % 1050+ | 36.0 | 18.0 | 0.0 | 100.0 |
| Paraffins | 16.0 |  | 27.0 |  |
| naphthenes | 19.0 |  | 39.0 |  |
| 1 ring aromatics | 8.0 |  | 26.0 |  |
| 2 ring aromatics | 15.0 |  | 7.0 |  |
| 3 ring aromatics | 17.0 |  | 2.0 |  |
| 4 ring aromatics | 13.0 |  | 0.0 |  |

TABLE 2

Steam Cracking Yields: Hydroprocessor 1050− Liquids

|  | Steam cracker Yields, wt % |
| --- | --- |
| fuel gas | 10 |
| ethane/propane | 5 |
| ethylene | 21 |
| propylene | 13 |
| C4's | 10 |
| BTX | 9 |
| Other SCN | 11 |
| tar and gas oil | 21 |

The results in Table 1 suggest that the feed to the resid hydroprocessing step contained 36 wt % of material boiling above 1050° F. The product from the hydroprocessing step contained 18 wt % of material boiling above 1050° F. Conventional hydroprocessing resulted in about 50% conversion of the vacuum resid fraction of the feedstock. This means that hydroprocessing followed by vacuum distillation results in a product with 18 wt % vacuum resid, and close to 80 wt % liquids suitable for steam cracker feedstock. The 18 wt % vacuum resid is substantially enriched in hydrogen but can only be sold as low sulfur fuel oil unless further processed. It is desirable to decrease the yield of low sulfur fuel oil and increase the yield of steam cracker feedstock. The visbreaking step converts roughly 60 wt % of 12.5/wt %–H, 1050° F.+ hydroprocessor/residfiner effluent into steam cracker feedstock. The unconverted 1050° F.+ hydroprocessor effluent is 10.8 wt % H which is similar to the H content of the feedstock to the resid hydroprocessor (11.3 wt %). The combination of resid hydroprocessing and visbreaking results in an overall 80% conversion of the vacuum resid portion of the feedstock to the hydroprocessor. The 7 wt % low sulfur fuel oil ("resid" in FIG. 5) has similar hydrogen content to the resid hydroprocessor feedstock so almost none of the hydrogen consumed in the resid hydroprocessor is sold to customers as fuel oil. Instead, resid hydroprocessing the feedstock enables visbreaking to be carried out at unusually high conversion. Feeding severely hydroprocessed resid to a visbreaker is also believed to be a significant advantage of embodiments of the present invention heretofore unrealized in the art, since it is not at all obvious why it would be useful to visbreak a feedstock according to the present invention, as opposed to sending the feedstock to a coker or to an FCC unit as in the prior art.

Resid hydroprocessing using feedstocks and conditions similar to those cited in the tables above is practiced to pretreat resid for use as feedstock to an FCC unit. In an FCC unit, the hydroprocessed resid may be converted into liquid and gas products with a coke yield of about 5 to 6 wt %. It is highly surprising that resid hydroprocessing followed by visbreaking and steam cracking results in similar overall resid conversion to liquid and gas products. The byproduct from resid hydroprocessing, visbreaking, and steam cracking is low sulfur fuel oil ("resid" in FIG. 5) which has significantly higher value than coke on FCC catalyst.

Two key parameters for steam cracker feedstock are wt % hydrogen and wt % polynuclear aromatics. Ethylene yield may closely correlate with wt % hydrogen and tar yield may closely correlate with wt % polynuclear aromatics. The resid hydroprocessing of FIG. 6 results in a product with hydrogen content typical of ordinary VGO's used in the steam cracking art, but with significantly lower concentrations of polynuclear aromatics.

A consequence of steam cracking feedstocks with >20 wt % aromatics is tar yields between 10 and 20 wt %. The process of the invention provides an opportunity to eliminate or greatly reduce tar as a product by recycling the tar to the hydroprocessor. Tar hydrogenation followed by steam cracking enables substantially complete conversion of tar to lighter products. This is a desirable but not solely necessary aspect of the process of the invention. Steam cracker tar was previously not normally hydroprocessed. Problems with fouling, incompatibility, and low reactivity were anticipated.

While the above embodiment has been illustrated using, as feed, atmospheric resid, any crude or fraction thereof may benefit from the present invention. In preferred embodiments, the feed is selected from at least one of heavy crude oil, vacuum resids, fuel oil, FCC cycle oils, coker gas oils, cracker tar, topped crude, and any other feed containing resid and/or a high concentration of multicyclic aromatic species. Mixtures of such feeds, such as provided by crude, are also preferred. FIGS. 1-6 represent only a small number of the countless number of possible optimizations directed to minimize refinery energy usage and maximize efficient use of hydrogen and hydrocarbon feed sources.

By way of further non-limiting example, illustrating yet still another embodiment, which may be a more preferred embodiment, the source of hydrogen used in the system (e.g., in the HDP units) may be from a methane source, particularly a remote methane. Use of remote methane as a source for hydrogen is described in U.S. Pat. No. 6,784,329. Maximizing the value of remote methane resources is an old problem in the industry. While methane commands a premium value for the production of hydrogen, frequently, neither chemical can be shipped long distances economically. Use of methane from remote areas or other sources of high and/or underutilized methane volumes for hydrogenation of the feedstocks to the hydroprocessing unit may facilitate improved economic generation of valuable products from steam cracking. The term "remote" is not limited to distant but rather is defined more broadly to include substantially any suitable source of methane and/or hydrogen that might otherwise only have less valuable options or opportunities than for use in the described processes. This includes methane produced in various parts of the world in substantial volumes, that may have limited, costly, or otherwise unfavorable access to markets or limited use. Such methane may be converted to hydrogen for use in the inventive processes.

Crude oil typically contains a minimum of about 10 wt % hydrogen. Fully hydrogenated crude (where the crude contains substantially only paraffins and cycloparaffins, having >95 wt % conversion of sulfur, nitrogen, and oxygen-containing impurities), may contain as much as about 14-15 wt % hydrogen. This saturated cracker feed is a highly preferred feed in the present invention. Petrochemical yields of crude having 14.5 wt % hydrogen may be increased substantially over crude having 10-11 wt % hydrogen.

A convenient method of converting methane to hydrogen remotely is by exploitation of a steam reforming unit, which are available from numerous commercial sources. In steam reforming, light hydrocarbons such as methane are reacted with steam to form hydrogen and carbon monoxide. The reaction may be illustrated by the well-known Syngas equilibrium equation:

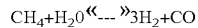

$$CH_4 + H_2O \rightleftharpoons 3H_2 + CO$$

Typically Syngas is exploited by, for instance conversion into lower alkanes by, for instance Fischer-Tropsch catalysts, which may be fed into a naphtha cracker to generate ethylene. However, according to the present invention, hydrogen may be extracted from the product side of the equation and used to hydrogenate crude or resid-containing fraction thereof. The carbon monoxide may be further reacted with steam to form additional hydrogen (and carbon dioxide) in the water gas shift reaction. Other reactions may generate hydrogen from methane, for instance, reaction of methane with oxygen to produce hydrogen and carbon monoxide (partial oxidation).

The present invention thus allows the producer to locate the hydroprocessing HDP unit close to the methane source (e.g., remote methane), hydrogenate feed comprising resid (either from well-heads located near the remote methane or by shipping the resid-containing material to the remote methane), and then ship the product of the HDP unit to the steam cracker (or locate the steam cracker at the remote source).

The present invention provides numerous advantages besides those pointed out above. In preferred embodiments, the invention provides for one or more of the following advantages: (a) use of lowest cost feedstock (feeds high in 1050+ (565° C.) resid and/or polynuclear aromatics, and/or heteroatoms; and use of remote methane); (b) high combined 1050° F.+ (565° C.) resid conversion when the conversion in the residfiner and the visbreaker are combined, (c) low cost integration of feed, including hydrogen, with steam cracker facility, substantially eliminating transportation costs; (d) single feed simplifies pyrolysis unit design and/or maintenance; (e) reduces problem of treatment/disposal of resid/asphaltene/tar/sulfur and nitrogen polynuclear molecules ("bottom of barrel"); (f) provides alternative to naphtha reforming for the production of aromatics product.

Having thus described the invention generally and with reference to specific embodiments, in preferred, exemplary embodiments, the invention relates to processes for producing olefins comprising: (i) hydroprocessing a feed comprising crude or a crude fraction comprising resid in a hydroprocessing unit at a temperature sufficient to promote incipient thermal cracking of the resid; (ii) obtaining an effluent from a resid hydroprocessing unit, wherein the effluent comprises resid; (iii) separating the effluent in a separator, into an overhead stream and a bottoms stream, the bottoms stream comprising hydroprocessed resid; (iv) feeding the overhead stream to a steam cracker; (v) steam cracking the overhead stream and obtaining a steam cracker effluent from the steam cracker comprising olefins; (vi) feeding the bottoms stream to a catalytic cracking unit; and (vii) cracking the bottoms stream in the catalytic cracking unit to obtain a catalytically cracked stream comprising at least one of gas oil and olefins. Preferably, the temperature that is sufficient to promote incipient thermal cracking is from about 750° F. (399° C.) to about 900° F. (482° C.). In some more preferred embodiments, the temperature sufficient to promote incipient thermal cracking is at least about 780° F. (415° C.), or more preferably at least about 800° F. (427° C.), up to about 900° F. (482° C.).

After initiating the cracking process in the hydroprocessing stage, the effluent is fed to a separator, preferably through a pressure drop during the transition to the separator. In the separator, the cracking process continues, supported by at least the temperature and the improved concentration of lighter boiling fractions from the previously cracked resid. The effluent from the hydroprocessing unit is at least partially thermally cracked in the separator. e.g., the cracking process continues in the separator, serving to reduce the liquid portion and increase the proportion of vapor.

The term separator is used to broadly encompass substantially any vapor liquid separator, but includes, though is not limited to, units or vessels such as at least one of a visbreaker, a flash drum, a high pressure separator, and a another vapor liquid separator, such as a reduced pressure vapor liquid separator that might not be considered a high pressure separator. It is a key aspect of the present invention that the process includes catalytic cracking and includes a catalytic cracker to facilitate further cracking of the bottoms from the separation process. The catalytic cracking unit may preferably comprise a fluidized catalytic cracking unit ("FCC"). In other embodiments, the catalytic cracking unit may comprise a hydrocracking catalytic cracking unit. Preferably, the bottoms stream is combined in the catalytic cracking unit with at least one hydrocarbon stream having a boiling point that is lower than the boiling point of the bottoms stream. The lighter stream may be mixed with the bottom stream at substantially any point between the separator and the catalytic cracking unit, including at the catalytic cracking unit. The lighter stream may assist processing of the bottoms stream in the catalytic cracking unit.

During and/or prior to separation of the vapor fraction from the liquid fraction, the process may include the step of flashing the effluent through at least one pressure drop to reduce the pressure of the effluent by at least one-half of the pressure of the effluent in the hydroprocessing unit, prior to or during the step of separating the effluent. This may involve staged flashing of pressure or a single stage flashing of pressure.

In addition to dropping the pressure to facilitate conversion and separation, the step of separating may also include (i) heating the effluent from the resid hydroprocessor to a temperature sufficient to support thermal cracking or the resid, and (ii) using a vapor liquid separator to separate the heated effluent. In the heated separation and/or flashing process, preferably, the hydrogenated effluent is heated to a the temperature sufficient to promote thermal cracking is within a range of from about 750° F. (399° C.) to about 900° F. (482° C.). Preferably, the temperature sufficient to promote thermal cracking is at least about 780° F. (415° C.), and more preferably, the temperature sufficient to promote thermal cracking is at least about 800° F. (427° C.), and more preferably, is at least about 850° F. (454° C.). To provide at least a portion of the heat for visbreaking, preferably the effluent is fed to the convection section of the steam cracker prior to visbreaking and separation of the effluent into the overhead stream and the bottoms stream. Additionally, steam is preferably added to the effluent from the resid hydroprocessing unit. After steam cracking, the process may also include separating and recovering the olefins from the steam cracker effluent. Preferably, the separator is heat integrated with the steam cracker.

In preferred processes, the feed to the hydroprocessing may be a hydrocarbon feed stock containing greater than 20 wt % 1050° F.+ (565° C.) resid to obtain a hydroprocessed crude or hydroprocessed crude fraction as the effluent from the resid hydroprocessing unit, and the effluent comprises resid. The feed may comprise crude or resid-containing crude fraction contains at least one impurity selected from: (a) sulfur in the amount of greater than 1 wt %, based on the weight of the feed; (b) resid in the amount of greater than 10 wt %, based on the weight of the feed; and (c) naphthenic acids as measured by a TAN of $\geq 1.0$ KOH/g oil (ASTM D-664). The hydroprocessing preferably saturates at least 20 wt % of the aromatic species in the feed.

The inventive processes also include a hydroprocessing and steam cracker system for making olefins from a feed comprising at least one of crude and crude fractions comprising resid, the system comprising at least one hydroprocessor, at least one vapor liquid separator, at least one catalytic cracking unit, and at least one steam cracker. The catalytic cracking unit preferably comprises at least one of a hydrocracking unit and a fluidized cracking unit. In a preferred embodiment, the catalytic cracking unit is also heat integrated with the steam cracker. The system also may include a steam reformer that provides hydrogen to the hydroprocessing apparatus, and/or a heater to heat the feed (i) prior to the separator, and/or (ii) in the separator unit.

In still another embodiment, the inventive process includes a process for making olefins from a hydrocarbon feed comprising: (i) feeding a resid-containing hydrocarbon feed into a hydroprocessing apparatus and hydroprocessing the resid-containing hydrocarbon material to form a hydroprocessed effluent comprising resid, (ii) reheating the hydroprocessed effluent in a convection section of a steam cracker; (iii) separating a vapor fraction from a liquid fraction in a vapor liquid separator, wherein the liquid fraction comprises resid; (iv) steam cracking the vapor fraction in a steam cracker to create a steam cracker effluent comprising olefins; (v) separating the steam cracker effluent to recover at least one of a $C_2$-$C_6$ olefin and a single ring aromatic species; (vi) feeding the liquid fraction to a catalytic cracker; (vii) cracking the liquid fraction in the catalytic cracker to create a catalytic cracker effluent comprising at least one of olefins and gas oil; and (viii) separating the catalytic cracker effluent to recover at least one of a $C_2$-$C_6$ olefin and a single ring aromatic species. The catalytic cracker preferably comprises at least one of a fluidized catalytic cracker and a hydrocracking catalytic cracking unit.

Another preferred embodiment of the invention relates to an integrated hydroprocessing and steam cracker system for making olefins from crude and crude fractions comprising resid, the system comprising at least one hydroprocessing apparatus, at least one high pressure separator, at least one visbreaker, at least one steam cracker optionally having a vapor liquid separation device integrated therewith, at least one catalytic cracker for processing bottoms from the visbreaker, and at least one steam cracker product recovery apparatus. This may be modified or enhanced by one or more of the following: the system further comprises a steam reformer co-located with the hydroprocessing apparatus configured so as to provide hydrogen to the hydroprocessing apparatus; the system further characterized as comprising in series and in the following order a visbreaker and at least one steam cracker optionally having a vapor liquid separation device integrated therewith; wherein the system does not comprise the integrated vapor liquid separation device; wherein the system comprises the integrated vapor liquid separation device; wherein the visbreaker is integrated with the steam cracker between the convection section and radiant sections. Heat integration improves the efficiency of the process. Integration also initiates resid cracking relatively early in the processing steps, e.g., during hydroprocessing, creating in improved concentration of lighter boiling point ends earlier in the resid-processing steps. Thermal cracking continues through out processing, until final separation of the overhead stream in the visbreaker. This higher concentration of light ends may act to improve the visbreaking and further cracking or the resid during the processing and separation, all the way through to pyrolysis.

Yet another preferred embodiment includes a process for making olefins from a hydrocarbon feed comprising feeding the feed through a system comprising a hydroprocessing apparatus and a steam cracker, the improvement comprising feeding a resid-containing material directly into a hydroprocessing apparatus and hydroprocessing the resid-containing material, visbreaking the effluent of the hydroprocessing apparatus in a visbreaker, and then obtaining at least one of a C2-C6 olefin and single ring aromatic species as an effluent of a steam cracker, which may be modified or enhanced by an embodiment wherein substantially all of the effluent of the visbreaker is provided to the convection section of a steam cracker where it is mixed with steam and then sent to a vapor liquid separation device integrated with the steam cracker to provide a first stream consisting essentially of vapor material and a second stream consisting essentially of non-vapor material, and then cracking the vapor material in the radiant section of the steam cracker and recovering an effluent of the steam cracker comprising at least one of a C2 to C6 olefin and single ring aromatic species. Any visbreaker bottoms may be fed to an FCC unit for further processing. Yet still another embodiment of the invention is a process comprising providing a feedstream comprising resid to a system according to any one of the system embodiments set forth in the present disclosure, particularly the preferred embodiments set forth in this paragraph, and obtaining from the steam cracker product recovery apparatus at least one product selected from C2-C6 olefins and single ring aromatics.

Still other preferred embodiments of the inventive processes may be described as follows: (i) Obtaining an effluent from a resid hydroprocessing unit, wherein the effluent comprises 650° F.+ (343° C.+) resid; (ii) separating the effluent in a separator, into an overhead stream and a bottoms stream; then (iii) passing the overhead stream from the separator to a steam cracker; (iv) steam cracking the overhead in the steam cracker and obtaining a steam cracker product from the steam cracker, the product comprising olefins, and (v) feeding the separator bottoms to a catalytic cracking unit. Preferably, step (iii) is characterized by passing the overhead from the separator to the steam cracker as vapor. The separator may comprise at least one of a visbreaker, a flash drum, a high pressure separator, and a vapor liquid separator. It is understood that arguably, there may be very little difference in these items and the terms are commonly used interchangeably. The step of separating may comprise visbreaking the effluent and separating a vapor fraction from a liquid fraction.

Preferably, the process also comprises the step of flashing the effluent through at least one pressure drop to reduce the pressure of the effluent by at least one-half of the pressure of the effluent in the hydroprocessing unit, prior to steam cracking the effluent in the steam cracker. In practice, the pressure drop may occur substantially in conjunction with the visbreaking operation to cause the flashing of a portion of the liquid fractions to vapor fractions within the visbreaker/separator. At least one of the pressure drops occurs substantially immediately prior to the separator or within the separator. It is preferred that thermal cracking of the feedstock begin in the hydroprocessing unit and that the cracking continue in the visbreaker/separator. Surprisingly, the severe hydroprocessing plus the severe visbreaking serves to break down a substantial portion of the 650° F.+ (343° C.+) resid and even a substantial portion of the 1050° F.+ (565° C.+) resid. Thereby, a majority by weight of the bottoms fraction from the separation step comprises resid having a boiling point of at least 900° F. (482° C.), and preferably of at least 1050° F.+ (565° C.+). In preferred processes, the step of separating includes separating the effluent in a vapor liquid separation vessel, such as a flash drum or visbreaker, wherein the vessel is at least one of (i) heat integrated with the steam cracker, such as by location and/or connective piping so as not to require a separate heat source, and/or (ii) heated with a heat source other than the steam cracker.

In preferred embodiments, the effluent in the separator/visbreaker is heated to a temperature of at least 750° F. (399° C.), more preferably to a temperature of at least 800° F., still more preferably to a temperature of at least 850° F. (454° C.), yet still most preferably to a temperature of from about 750° F. (399° C.) to about 900° F. (482° C.). Also preferably, the effluent in the separator/visbreaker is retained in the separator for at least a determined minimum amount of time and not longer than a determined maximum amount of time. This is commonly the practice with visbreaking and flash drum type operations and is necessary to quench the bottoms liquid stream to stop the reaction from proceeding to fouling or coking, while still permitting adequate time for the reaction to sufficiently crack a substantial portion of the resid, including the 1050° F.+ (565° C.+) resid into lighter components. The exact timing will depend upon the crude feedstock properties and the properties of the effluent in the separator.

The meanings of terms used herein shall take their ordinary meaning in the art; reference shall be taken, in particular, to Handbook of Petroleum Refining Processes, Third Edition, Robert A. Meyers, Editor, McGraw-Hill (2004). In addition, all patents and patent applications, test procedures (such as ASTM methods), and other documents cited herein are fully

What is claimed is:

1. A process for producing olefins comprising:
   (i) hydroprocessing a feed comprising crude comprising resid or a crude fraction comprising resid in a hydroprocessing unit at a temperature sufficient to promote incipient thermal cracking of the resid, wherein the resid includes 1050° F.+(565° C.+) resid;
   (ii) obtaining hydrogenated C2+ effluent from a resid hydroprocessing unit, wherein the effluent comprises resid;
   (iii) separating the effluent in a separator that comprises at least one of a visbreaker, a flash drum, a high pressure separator, and a vapor liquid separator wherein the effluent in the separator is heated at visbreaking conditions to a temperature of at least about 850° F. (454° C.), into an overhead stream and a bottoms stream, the bottoms stream comprising hydroprocessed resid including 1050° F.+ (565° C.+) resid;
   (iv) feeding the overhead stream as vapor to a steam cracker;
   (v) steam cracking the overhead stream and obtaining a steam cracker effluent from the steam cracker comprising olefins;
   (vi) feeding the bottoms stream to a catalytic cracking unit; and
   (vii) cracking the bottoms stream in the catalytic cracking unit to obtain a catalytically cracked stream comprising at least one of gas oil and olefins;
   and further comprising flashing the effluent through at least one pressure drop to reduce the pressure of the effluent, prior to or during the step of separating the effluent.

2. The process of claim 1, wherein the temperature sufficient to promote incipient thermal cracking is from about 750° F. (399° C.) to about 900° F. (482° C.).

3. The process of claim 1, wherein the temperature sufficient to promote incipient thermal cracking is at least about 780° F. (415° C.).

4. The process of claim 1, wherein the temperature sufficient to promote incipient thermal cracking is at least about 800° F. (427° C.).

5. The process of claim 1, wherein the effluent from the hydroprocessing unit is thermally cracked in the separator.

6. The process of claim 1, wherein the catalytic cracking unit comprises a fluidized catalytic cracking unit ("FCC").

7. The process of claim 1, wherein the catalytic cracking unit comprises a hydrocracking catalytic cracking unit.

8. The process of claim 1, wherein the bottoms stream is combined in the catalytic cracking unit with at least one hydrocarbon stream having a boiling point that is lower than the boiling point of the bottoms stream.

9. The process of claim 1, further comprising the step of flashing the effluent through at least one pressure drop to reduce the pressure of the effluent by at least one-half of the pressure of the effluent in the hydroprocessing unit, prior to or during the step of separating the effluent.

10. The process of claim 9, wherein at least one of the at least one pressure drops occurs substantially immediately prior to the separator or within the separator.

11. The process of claim 1, wherein the step of separating includes (i) heating the effluent from the resid hydroprocessor to a temperature sufficient to promote thermal cracking of the resid, and (ii) using a vapor liquid separator to separate the heated effluent.

12. The process of claim 11, wherein the temperature sufficient to promote thermal cracking is from about 750° F. (399° C.) to about 900° F. (482° C.).

13. The process of claim 11, wherein the temperature sufficient to promote thermal cracking is at least about 780° F. (415° C.).

14. The process of claim 11, wherein the temperature sufficient to promote thermal cracking is at least about 800° F. (427° C.).

15. The process of claim 11, wherein the temperature sufficient to promote thermal cracking is at least about 850° F. (454° C.).

16. The process of claim 1, wherein the step of feeding the overhead stream to a steam cracker includes feeding the overhead stream from the separator to a convection section of a steam cracker.

17. The process of claim 1, wherein the crude fraction comprising resid includes at least one of atmospheric resid, vacuum resid, steam cracker tar, and at least a portion of the bottoms stream from the step of separating the effluent.

18. The process of claim 1, comprising passing the effluent to a convection section of the steam cracker prior to separation to provide heat for visbreaking of the effluent.

19. The process of claim 1, further comprising the step of adding steam to the effluent from the resid hydroprocessing unit.

20. The process of claim 1, further comprising the step of separating and recovering the olefins from the steam cracker effluent.

21. The process of claim 1, wherein the separator is heat integrated with the steam cracker.

22. The process of claim 1, wherein the crude or crude fraction contains greater than 20 wt % 1050° F.+ resid.

23. The process of claim 1, wherein the feed contains at least one impurity selected from:
   (a) sulfur in the amount of greater than 1 wt %, based on the weight of the feed;
   (b) resid in the amount of greater than 10 wt %, based on the weight of the feed; and
   (c) naphthenic acids as measured by a TAN of $\geq 1.0$ KOH/g oil (ASTM D-664).

24. The process of claim 1, wherein the step of hydroprocessing saturates at least 20 wt % of the aromatic species in the feed.

25. The process of claim 1, wherein the feed contains sulfur in the amount of greater than 1 wt %, based on the weight of the feed.

26. The process of claim 1, wherein the feed contains resid in the amount of greater than 20 wt %, based on the weight of the feed.

27. The process of claim 1, wherein the feed contains naphthenic acids as measured by a TAN of $\geq 1.0$ KOH/g oil (ASTM D-664).

28. The process of claim 1, wherein the feed containing 20 wt % to 50 wt % vacuum resid, based on the weight of the feed.

29. A process for making olefins from a hydrocarbon feed comprising:
(i) feeding a resid-containing hydrocarbon feed into a hydroprocessing apparatus and hydroprocessing the resid-containing hydrocarbon material to form a hydroprocessed C2+ effluent comprising resid, wherein the resid includes 1050° F.+ (565° C.+) resid;
(ii) reheating the hydroprocessed effluent in a convection section of a steam cracker;
(iii) separating a vapor fraction at visbreaking conditions that include a temperature of at least about 850° F. (454° C.) from the reheated effluent of step (ii) in a vapor liquid separator, providing a liquid fraction that comprises resid, including 1050° F.+ (565° C.+) resid;
(iv) steam cracking the vapor fraction in a steam cracker to create a steam cracker effluent comprising olefins;
(v) separating the steam cracker effluent to recover at least one of a $C_2$-$C_6$ olefin and a single ring aromatic species;
(vi) feeding the liquid fraction to a catalytic cracker;
(vii) cracking the liquid fraction in the catalytic cracker to create a catalytic cracker effluent comprising at least one of olefins and gas oil; and
(viii) separating the catalytic cracker effluent to recover at least one of a $C_2$-$C_6$ olefin and a single ring aromatic species;
and further comprising flashing the reheated effluent through at least one pressure drop to reduce the pressure of the reheated effluent, prior to or during the step of separating the vapor fraction from the reheated effluent.

30. The process of claim 29, further comprising the step of adding steam to at least one of the hydroprocessed effluent and the vapor fraction.

31. The process of claim 29, wherein the catalytic cracker comprises at least one of a fluidized catalytic cracker and a hydrocracking catalytic cracking unit.

32. The process of claim 29, further comprising flashing the hydroprocessed effluent at least one of prior to separation of the effluent and during separation of the effluent.

33. The process of claim 29, wherein the effluent is heated in the convection section of the steam cracker prior to step (iii).

34. The process of claim 29, wherein step (iii) comprises thermally cracking a portion of the effluent.

\* \* \* \* \*